US011903532B2

(12) United States Patent
Cittadino et al.

(10) Patent No.: US 11,903,532 B2
(45) Date of Patent: Feb. 20, 2024

(54) PRODUCT REMOVAL SWITCH SHUTTLE FOR PRODUCT DISPENSERS

(71) Applicant: GPCP IP Holdings LLC, Atlanta, GA (US)

(72) Inventors: Antonio M. Cittadino, Appleton, WI (US); Nickolas E. Madsen, Atlanta, GA (US)

(73) Assignee: GPCP IP Holdings LLC, Atlanta, GA (US)

(*) Notice: Subject to any disclaimer, the term of this patent is extended or adjusted under 35 U.S.C. 154(b) by 567 days.

(21) Appl. No.: 17/101,000

(22) Filed: Nov. 23, 2020

(65) Prior Publication Data

US 2022/0160188 A1 May 26, 2022

(51) Int. Cl.
*A47K 10/36* (2006.01)
*B26D 5/02* (2006.01)

(52) U.S. Cl.
CPC ............ *A47K 10/3643* (2013.01); *B26D 5/02* (2013.01)

(58) Field of Classification Search
CPC .............................. B26D 5/02; A47K 10/3643
USPC ............................................................ 83/649
See application file for complete search history.

(56) References Cited

U.S. PATENT DOCUMENTS

| | | | |
|---|---|---|---|
| 5,441,189 | A | 8/1995 | Formon et al. |
| 6,820,785 | B2 | 11/2004 | Kapiloff |
| 6,871,815 | B2 | 3/2005 | Moody et al. |
| 6,892,620 | B2 | 5/2005 | Kapiloff |
| 7,044,421 | B1 | 5/2006 | Omdoll et al. |
| 7,270,292 | B2 | 9/2007 | Rasmussen |
| 7,793,882 | B2 | 9/2010 | Reinsel et al. |
| 7,861,964 | B2 | 1/2011 | Cittadino et al. |
| 7,887,005 | B2 | 2/2011 | Troutman et al. |

(Continued)

FOREIGN PATENT DOCUMENTS

| | | | |
|---|---|---|---|
| CA | 2469032 | C | 7/2010 |
| CA | 2642846 | C | 1/2014 |

(Continued)

OTHER PUBLICATIONS

"Smart Essence™ Electronic Roll Towel Dispenser;" *san jamar*; retrieved Nov. 20, 2020 from https://www.sanjamar.com/product/smart-essence-electronic-roll-towel-dispenser/.

(Continued)

*Primary Examiner* — Omar Flores Sanchez

(57) ABSTRACT

An example sheet product dispenser includes a dispensing mechanism operable to dispense sheet product to provide the dispensed portion within a dispensing chute. A tear bar is provided for separating the dispensed portion from a remainder of the sheet product. A shuttle is positioned between a switch and the dispensed portion. The shuttle is movable between an unactuated position and an actuated position. When the shuttle is in the unactuated position, the switch is in the unactuated configuration. The shuttle and the switch are positioned within the sheet product dispenser such that as the user pulls on the dispensed portion the shuttle moves to the actuated position so that the shuttle applies a force on the switch sufficient enough to transition the switch to an actuated configuration to indicate removal of the dispensed portion. Other example improvements include providing feedback for user inputs to a product dispenser.

18 Claims, 22 Drawing Sheets

(56) References Cited

U.S. PATENT DOCUMENTS

| | | | |
|---|---|---|---|
| 7,996,108 | B2 | 8/2011 | Yardley |
| 8,162,252 | B2 | 4/2012 | Cittadino et al. |
| 8,600,547 | B2 | 12/2013 | Petersen et al. |
| 8,632,030 | B2 | 1/2014 | Troutman et al. |
| 8,746,510 | B2 | 6/2014 | Cittadino et al. |
| 8,919,233 | B2 | 12/2014 | Lewis et al. |
| 9,067,754 | B2 | 6/2015 | Petersen et al. |
| 9,144,352 | B2 | 9/2015 | Cittadino et al. |
| 9,167,941 | B2 | 10/2015 | Cittadino et al. |
| 9,237,815 | B2 | 1/2016 | Smith |
| 9,474,422 | B1 | 10/2016 | Troutman et al. |
| 9,604,811 | B2 | 3/2017 | Case et al. |
| 9,642,503 | B1 | 5/2017 | Troutman et al. |
| 9,701,508 | B2 | 7/2017 | Diamond |
| 9,730,559 | B2 | 8/2017 | Keily et al. |
| 9,918,597 | B2 | 3/2018 | Rubenson et al. |
| 9,999,326 | B2 | 6/2018 | Borke et al. |
| 10,159,389 | B2 | 12/2018 | Goeking et al. |
| 10,238,245 | B2 | 3/2019 | Rubenson et al. |
| 10,376,109 | B2 | 8/2019 | Fellhoelter |
| 10,441,117 | B2 | 10/2019 | Osborne, Jr. |
| 10,610,064 | B2 | 4/2020 | Osborne et al. |
| 2003/0213809 | A1 | 11/2003 | Weigen |
| 2007/0194166 | A1 | 8/2007 | Reinsel et al. |
| 2010/0078459 | A1 | 4/2010 | Reinsel et al. |
| 2010/0269653 | A1 | 10/2010 | Larsson |
| 2010/0286818 | A1 | 11/2010 | Goeking et al. |
| 2011/0132955 | A1 | 6/2011 | Achton |
| 2012/0312853 | A1 | 12/2012 | Osborne et al. |
| 2013/0213995 | A1 | 8/2013 | Horel et al. |
| 2016/0030620 | A1 | 2/2016 | Peterson et al. |
| 2016/0353946 | A1 | 12/2016 | Osborne, Jr. |
| 2017/0290471 | A1 | 10/2017 | Borke et al. |
| 2017/0290472 | A1 | 10/2017 | Borke et al. |
| 2017/0290473 | A1 | 10/2017 | Borke et al. |
| 2018/0064297 | A1 | 3/2018 | Goeking et al. |
| 2018/0177348 | A1 | 6/2018 | Swanson et al. |
| 2019/0059661 | A1 | 2/2019 | Goltz et al. |
| 2019/0174972 | A1 | 6/2019 | Osborne, Jr. et al. |
| 2019/0216270 | A1* | 7/2019 | Osborne, Jr. ...... A47K 10/3643 |
| 2020/0187727 | A1 | 6/2020 | Osborne, Jr. et al. |

FOREIGN PATENT DOCUMENTS

| | | | |
|---|---|---|---|
| CA | 2809090 | C | 10/2017 |
| CA | 3018401 | A1 | 10/2017 |
| CA | 2838721 | C | 9/2019 |
| EP | 2718213 | B1 | 11/2016 |
| MX | PA04005298 | A | 9/2004 |
| MX | 2010006136 | A | 7/2010 |
| MX | 2016009419 | A | 9/2016 |
| MX | 2018012451 | A | 1/2019 |
| WO | WO 2007/039790 | A1 | 4/2007 |
| WO | WO 2013/043179 | A1 | 9/2011 |
| WO | WO 2013/063731 | A1 | 5/2013 |

OTHER PUBLICATIONS

"Snap Action Microswitches;" *Zippy Technology Corp.*; retrieved Jun. 24, 2021 from http://www.zippy.com/ecproductlist.aspx?pcs_rfnbr-7.

* cited by examiner

PRODUCT REMOVAL SWITCH SHUTTLE FOR PRODUCT DISPENSERS

FIELD OF THE INVENTION

Example embodiments of the present invention generally relate to product dispensers and, more particularly to, a shuttle for improved product removal (e.g., tear) occurrence determination for a sheet product dispenser.

BACKGROUND

On-demand product (e.g., paper towel, tissue, napkin, soap, sanitizer, etc.) dispensers are useful in many environments. Component cost and general size constraints (e.g., for placement of the dispenser within the environment) are factors that are important for product dispensers. Knowing when a dispense occurs can be useful for various features of the product dispenser (e.g., determining the amount of product dispensed, determining when the product was dispensed, operating according to hang mode, etc.). Moreover, some product dispensers may be provided with user interfaces for a maintainer to control or adjust various features/functions of the product dispenser.

BRIEF SUMMARY

Various example embodiments of the present invention described herein provide improvements related to such factors and features for product dispensers.

In some example embodiments, an improved structure for determining a product removal (e.g., tear) occurrence is provided. For example, a shuttle is positioned within the sheet product dispenser. The shuttle uses the force of the paper towel to move to an actuated position to interact with a switch to indicate removal of a dispensed portion of the sheet product. In this regard, the shuttle may be positioned between the tear bar and a switch on a printed circuit board (PCB) and may move between an unactuated position and an actuated position where the shuttle contacts the switch to indicate removal of the dispensed portion. By utilizing such an example shuttle, a reduction of components of the sheet product dispenser can be realized and an already present force provided by the user to initiate a tear can be utilized to achieve determination of removal of the dispensed portion. Moreover, the physical distance between the tear bar and the main PCB can be traversed in a manner that avoids extra components, such as a secondary PCB. This decreases component and manufacturing costs while increasing reliability. Additionally, manufacturing inconsistencies in the tear bar, for example, can be accounted for via the shape and material of the shuttle—thereby ensuring an accurate tear occurrence determination. A further benefit is that the shuttle may also manage the force provided by the tear bar with respect to the switch, as it has been shown that excess force (which may occur during tearing) may risk damaging the switch. Another benefit includes mounting the switch in a location that is further away from dust generation (such as from rubbing the paper towel on the tear bar). Though some example embodiments describe a movable tear bar, in some embodiments, a fixed tear bar may be utilized and the force from the sheet product during removal may act on the shuttle to cause movement of the shuttle and actuation of the switch.

Some example embodiments relate to providing feedback to various user inputs for the product dispenser. For example, it may be difficult for a maintainer to determine whether they have effectively initiated an operation (e.g., changed a setting) of the dispenser, such as if capacitive sensor "buttons" are used for settings control or other operation. In this regard, there may be no tactile feedback with such capacitive sensor buttons, such as may be traditionally felt when a physical button/switch is utilized. Thus, some example embodiments are designed to provide feedback to the maintainer upon interaction with the user sensor corresponding to the "button". Such example feedback may vary, but in some example embodiments, the feedback may be provided via operation of the motor (e.g., briefly, pulsed, etc.) to indicate that the user sensor was triggered (and, thus, the setting has been changed or other operation initiated). In this regard, operation of the motor may cause physical feedback (e.g., vibrations of portions of the dispenser) and/or audible feedback (e.g., audible noises corresponding to operation of the motor). Notably, the feedback may be different than the operation actually performed due to the user sensor being activated (e.g., the setting changed). The length of operation of the motor may not be sufficient to cause a dispense of the product, but may be sufficient to provide the desired feedback. Variations in length of operation of the motor and/or number of pulses of the motor may be utilized for feedback corresponding to the maintainer interacting with different user sensors.

In an example embodiment, a sheet product dispenser for dispensing sheet product from a source of sheet product is provided. The sheet product dispenser comprises a switch for indicating removal of a dispensed portion of the sheet product. The switch comprises an actuated configuration and an unactuated configuration. The sheet product dispenser further includes a dispensing chute and a dispensing mechanism operable to dispense the sheet product to provide the dispensed portion of the sheet product for retrieval by a user, where at least a portion of the dispensed portion of the sheet product is within the dispensing chute. A tear bar is provided for separating the dispensed portion from a remainder of the sheet product. A shuttle with a first end and a second end is also provided. The shuttle is positioned between the switch and the dispensed portion of the sheet product within the dispensing chute. The shuttle is movable between an unactuated position and an actuated position. When the shuttle is in the unactuated position, the switch is in the unactuated configuration. The shuttle and the switch are positioned within the sheet product dispenser such that as the user pulls on the dispensed portion the shuttle moves to the actuated position so that the second end of the shuttle applies a force on the switch sufficient enough to transition the switch to the actuated configuration to indicate removal of the dispensed portion.

In some embodiments, the tear bar is movable between a first position and a second position. The shuttle is positioned between the tear bar and the switch. As the user pulls on the dispensed portion, a force from the sheet product on the tear bar causes the tear bar to move from the first position to the second position to cause the shuttle to move to the actuated position. In some embodiments, the shuttle defines a body that includes a first arm and a second arm. The first arm extends toward the tear bar in a first direction and defines a first tear bar end. The second arm extends toward the tear bar in a second direction and defines a second tear bar end. The first direction is different than the second direction such that the first tear bar end and the second tear bar end are spaced apart along the tear bar. In some embodiments, the first arm defines a first proximal end and wherein the second arm defines a second proximal end. The body defines a third arm that extends toward the switch and defines the second end of the shuttle and a third proximal end. The first proximal end of the first arm and the second proximal end of the second arm converge at the third proximal end of the third arm.

In some embodiments, the shuttle is formed separately from the tear bar.

In some embodiments, the shuttle is formed of flexible material.

In some embodiments, the sheet product dispenser further comprises an activation sensor configured to sense user input indicating a desire to perform a dispense from the sheet product dispenser. The activation sensor and the switch are mounted to a same printed circuit board. In some embodiments, the printed circuit board defines a first side and a second side that is opposite the first side. The activation sensor is mounted to the first side and the switch is mounted to the second side.

In some embodiments, the shuttle is configured to translate laterally within the sheet product dispenser between the unactuated position and the actuated position.

In some embodiments, the tear bar is fixedly mounted within the sheet product dispenser.

In some embodiments, the sheet product dispenser further comprises a controller configured to control operation of a motor to cause the dispensing mechanism to dispense the sheet product. The switch is mounted to a printed circuit board. The controller includes processing circuitry mounted to the printed circuit board such that the processing circuitry and the switch are mounted to the same printed circuit board.

In some embodiments, the sheet product dispenser further comprises a guide slot positioned within the dispenser and sized to movably fit the shuttle therein. The guide slot is configured to direct movement of the shuttle therein between the unactuated position and the actuated position.

In some embodiments, the sheet product dispenser further comprises a chassis configured for installation within a housing of the sheet product dispenser, wherein the dispensing mechanism and the tear bar are attached with the chassis, and wherein the shuttle is movable within the chassis.

In some embodiments, the shuttle is biased to the unactuated position.

In another example embodiment, a chassis for a sheet product dispenser for dispensing sheet product from a source of sheet product is provided. The chassis comprises a switch for indicating removal of a dispensed portion of the sheet product. The switch comprises an actuated configuration and an unactuated configuration. The chassis further includes a dispensing chute and a dispensing mechanism operable to dispense the sheet product to provide the dispensed portion of the sheet product for retrieval by a user. At least a portion of the dispensed portion of the sheet product is within the dispensing chute. A tear bar for separating the dispensed portion from a remainder of the sheet product is also provided. A shuttle positioned between the switch and the dispensed portion of the sheet product within the dispensing chute is also provided. The shuttle is movable between an unactuated position and an actuated position. When the shuttle is in the unactuated position, the switch is in the unactuated configuration. The shuttle and the switch are positioned within the chassis such that as the user pulls on the dispensed portion the shuttle moves to the actuated position and applies a force on the switch sufficient enough to transition the switch to the actuated configuration to indicate removal of the dispensed portion.

In some embodiments, the tear bar is movable between a first position and a second position. The shuttle is positioned between the tear bar and the switch. As the user pulls on the dispensed portion, a force from the sheet product on the tear bar causes the tear bar to move from the first position to the second position to cause the shuttle to move to the actuated position. In some embodiments, the shuttle defines a body that includes a first arm and a second arm. The first arm extends toward the tear bar in a first direction and defines a first tear bar end. The second arm extends toward the tear bar in a second direction and defines a second tear bar end. The first direction is different than the second direction such that the first tear bar end and the second tear bar end are spaced apart along the tear bar. In some embodiments, the tear bar defines a first side and a second side. Application of a force by the sheet product on the tear bar as the user pulls on the dispensed portion occurs to the first side of the tear bar. The first end of the shuttle is positioned proximate the second side of the tear bar such that the second side of the tear bar provides a second force to the first end of the shuttle when the tear bar moves to the second position to cause the shuttle to move to the actuated position.

In some embodiments, the chassis further comprises an activation sensor configured to sense user input indicating a desire to perform a dispense. The activation sensor and the switch are mounted to a same printed circuit board.

In yet another example embodiment, a shuttle for contacting a switch of a sheet product dispenser is provided. The shuttle comprises a body comprising a first arm extending in a first direction. The first arm defines a first proximal end and a first distal end. The first distal end is configured to contact a tear bar of the sheet product dispenser. The body further comprises a second arm extending in a second direction that is different than the first direction. The second arm defines a second proximal end and a second distal end. The second distal end is configured to contact the tear bar of the sheet product dispenser in a spaced apart manner from the first distal end of the first arm. The body further comprises a third arm extending in a third direction that is different than the first direction and the second direction. The third arm defines a third proximal end and a third distal end. The third distal end is configured to, when a user pulls on a dispensed portion of the sheet product, apply a force on the switch of the sheet product dispenser sufficient enough to transition the switch to an actuated configuration to indicate the occurrence of removal of the dispensed portion of the sheet product from the sheet product dispenser. The first proximal end of the first arm and the second proximal end of the second arm converge at the third proximal end of the third arm.

In another example embodiment, a method for providing feedback to a user of a dispenser for dispensing product is provided. The method comprises receiving a signal, from a user input sensor of the dispenser, indicating the presence of a user. The user input sensor corresponds with an operation for the dispenser. The method further comprises causing, in response to receiving the signal performance of the operation corresponding to the user input sensor and operation of a motor of the dispenser for a predetermined amount of time to provide feedback to the user. The motor is further operable to cause occurrence of a dispense from the dispenser. The predetermined amount of time of operation of the motor is not sufficient to provide a predetermined amount of product to the user. The predetermined amount of product corresponds to a dispense of the product.

In some embodiments, the method further comprises determining the type of sensor associated with the received signal, and determining, based on the type of sensor, the predetermined amount of time to operate the motor from among a plurality of predetermined amounts of time.

In some embodiments, causing operation of the motor for the predetermined amount of time further comprises pulsing operation of the motor for multiple predetermined amounts of time with a period of no operation of the motor between consecutive pulses.

In some embodiments, the method further comprises determining at least one of the type of sensor associated with the received signal or a status corresponding to the sensor associated with the received signal, and determining, based on the type of sensor or the status, a number of pulses to apply when pulsing operation of the motor.

In yet another example embodiment, a dispenser for providing product from a product supply is provided. The dispenser comprises a dispensing mechanism operable to dispense the product and a motor operable to cause the dispensing mechanism to dispense the product. The dispenser further includes a sensor configured to sense the presence of a user and provide a signal indicative of the presence of the user and a desire to perform an operation for the dispenser. The dispenser further includes a controller operable to receive the signal, from the sensor, indicating the presence of the user and the desire to perform the operation for the dispenser. The controller is further operable to cause, in response to receiving the signal: performance of the operation; and operation of the motor for a predetermined amount of time to provide feedback to the user. The predetermined amount of time of operation of the motor is not sufficient to provide a predetermined amount of product to the user. The predetermined amount of product corresponds to a dispense of the product.

In some embodiments, the dispenser further comprises a chassis with a user input area associated with the operation and positioned relative to the sensor such that the sensor is configured to sense the presence of the user when the user touches the user input area.

In some embodiments, the motor is vibrationally connected to the chassis such that operation of the motor causes the user input area to vibrate so as to provide the feedback to the user.

In some embodiments, the sensor comprises a capacitive sensor.

In some embodiments, the dispenser further comprises a plurality of user input areas and a plurality of sensors, wherein each of the plurality of sensors corresponds to one of the plurality of user input areas. In some embodiments, the controller is operable to cause operation of the motor for the predetermined amount of time to provide the feedback to the user in response to receiving a signal from any of the plurality of sensors. In some embodiments, the controller is operable to cause operation of the motor for varying predetermined amounts of time depending on which of the plurality of sensors sent the received signal.

In some embodiments, the motor is configured to provide an audible noise during operation so as to provide the feedback to the user.

In some embodiments, the method further comprises an activation sensor configured to sense the presence of the user. The controller is operable to receive an activation signal from the activation sensor and, in response, cause operation of the motor to cause the dispensing mechanism to dispense the predetermined amount of product. The sensor is different than the activation sensor.

In some embodiments, the dispensing mechanism is operable to dispense sheet product from the dispenser.

In some embodiments, the dispensing mechanism is operable to dispense flowable material from the dispenser.

In yet another example embodiment, a chassis for a dispenser for providing product from a product supply is provided. The chassis comprises a dispensing mechanism operable to dispense the product and a motor operable to cause the dispensing mechanism to dispense the product. The chassis further includes a sensor configured to sense the presence of a user and provide a signal indicative of the presence of the user and a desire to perform an operation for the dispenser. The chassis further includes a controller operable to receive the signal, from the sensor, indicating the presence of the user and the desire to perform the operation for the dispenser. The controller is further operable to cause, in response to receiving the signal: performance of the operation; and operation of the motor for a predetermined amount of time to provide feedback to the user. The predetermined amount of time of operation of the motor is not sufficient to provide a predetermined amount of product to the user. The predetermined amount of product corresponds to a dispense of the product.

In some embodiments, the chassis further comprises a user input area associated with the operation and positioned relative to the sensor such that the sensor is configured to sense the presence of the user when the user touches the user input area.

In some embodiments, the motor is vibrationally connected to the chassis such that operation of the motor causes the user input area to vibrate so as to provide the feedback to the user.

In some embodiments, the chassis further comprises a plurality of user input areas and a plurality of sensors, wherein each of the plurality of sensors corresponds to one of the plurality of user input areas. The controller is operable to cause operation of the motor for the predetermined amount of time to provide the feedback to the user in response to receiving a signal from any of the plurality of sensors. In some embodiments, the chassis further comprises a plurality of user input areas and a plurality of sensors. The controller is operable to cause operation of the motor for varying predetermined amounts of time depending on which of the plurality of sensors sent the received signal.

In some embodiments, methods of manufacturing various example embodiments described herein are also contemplated.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 15:
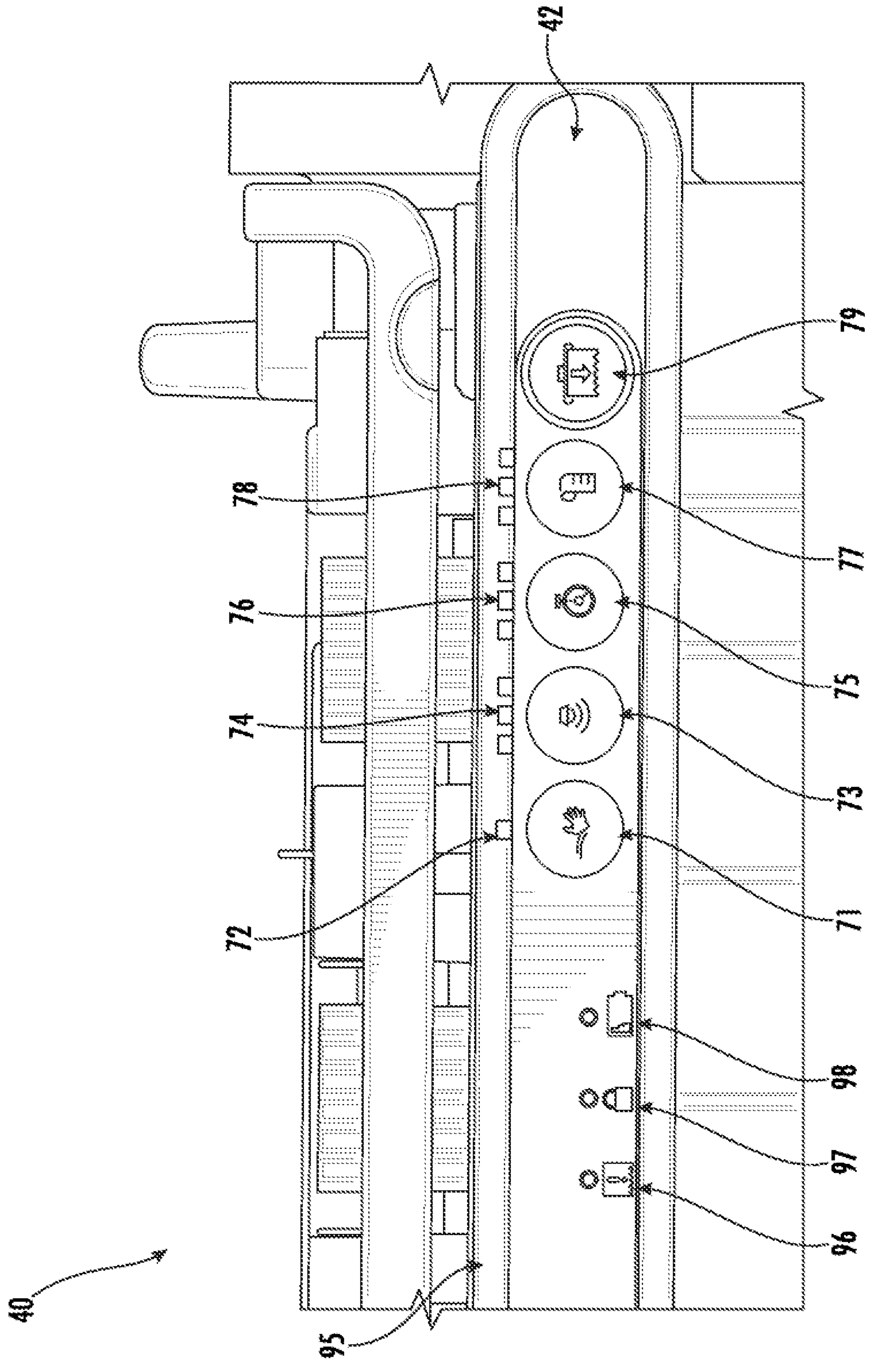
FIG. 15 shows a close-up of a portion of a user interface of the chassis shown in FIG. 3, in accordance with some embodiments discussed herein.
Figure 17A:
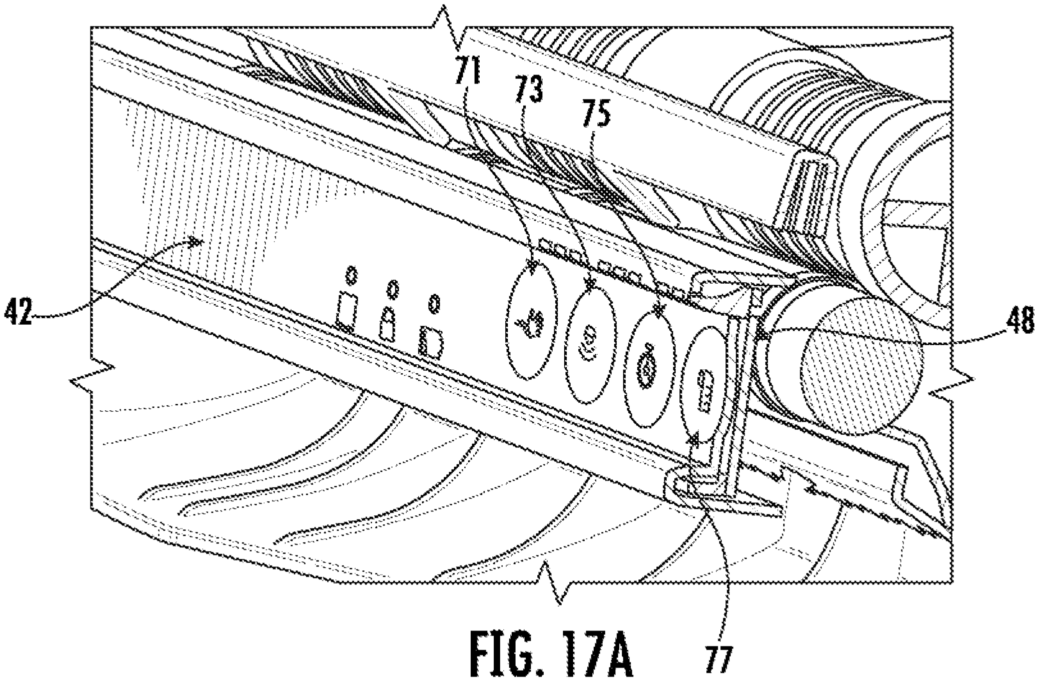
FIG. 17A shows a cross-sectional perspective view of the example user interface shown in FIG. 15, in accordance with some embodiments discussed herein.
Figure 17B:
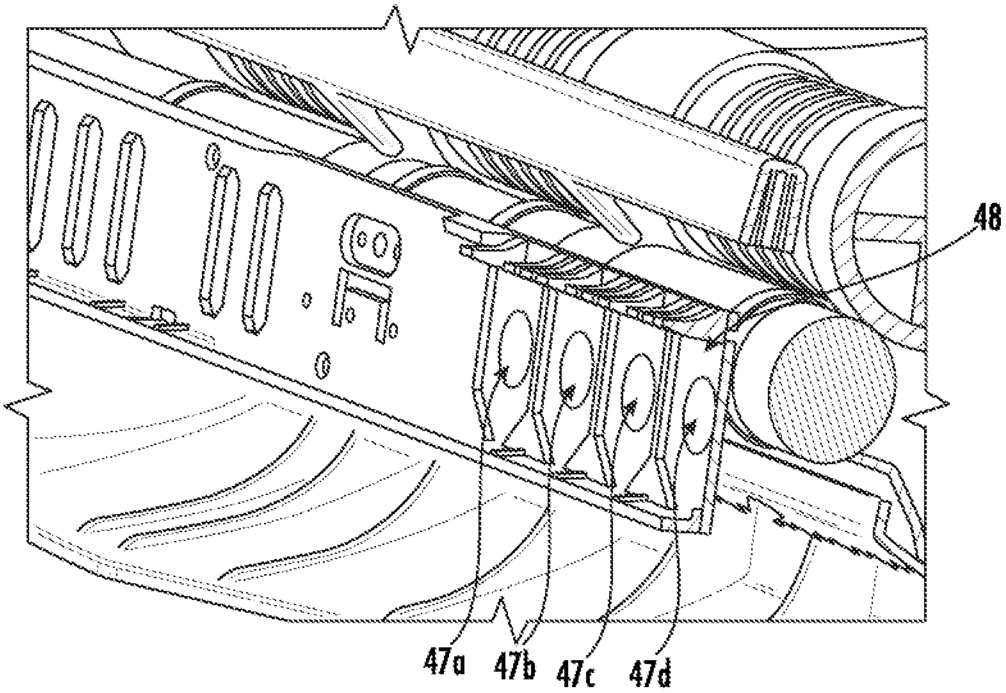
Figure 18:
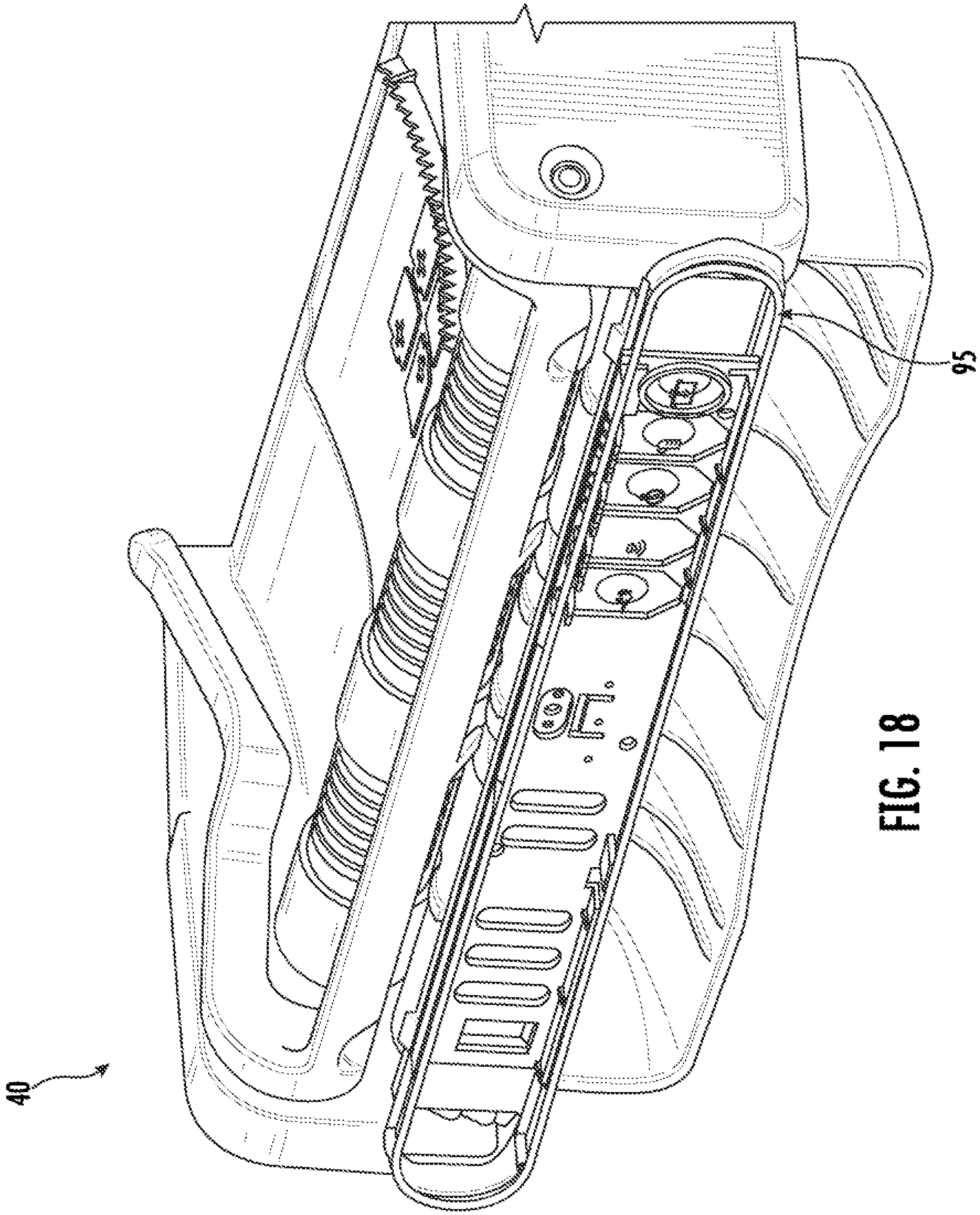
Figure 19:
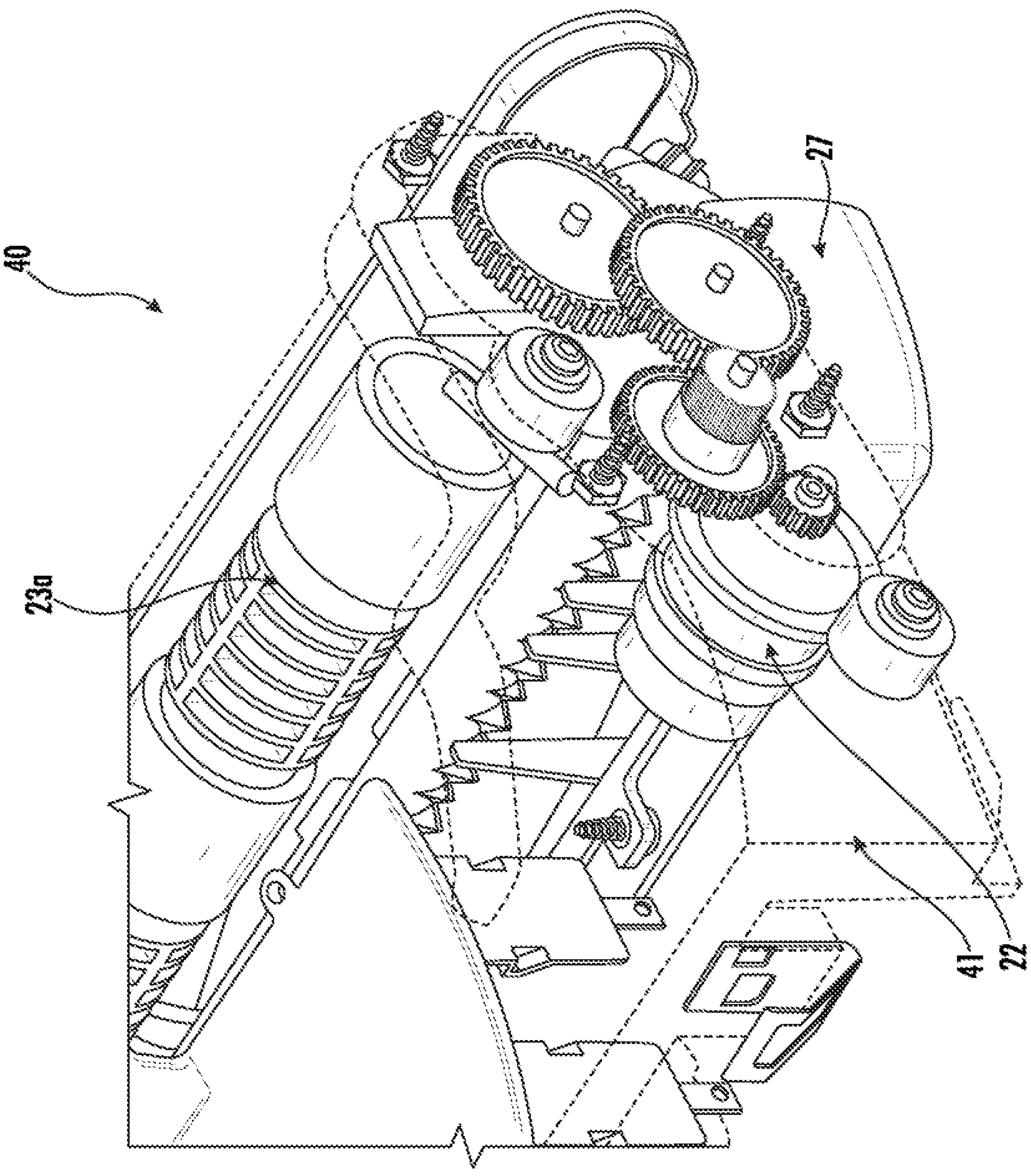
Figure 20:
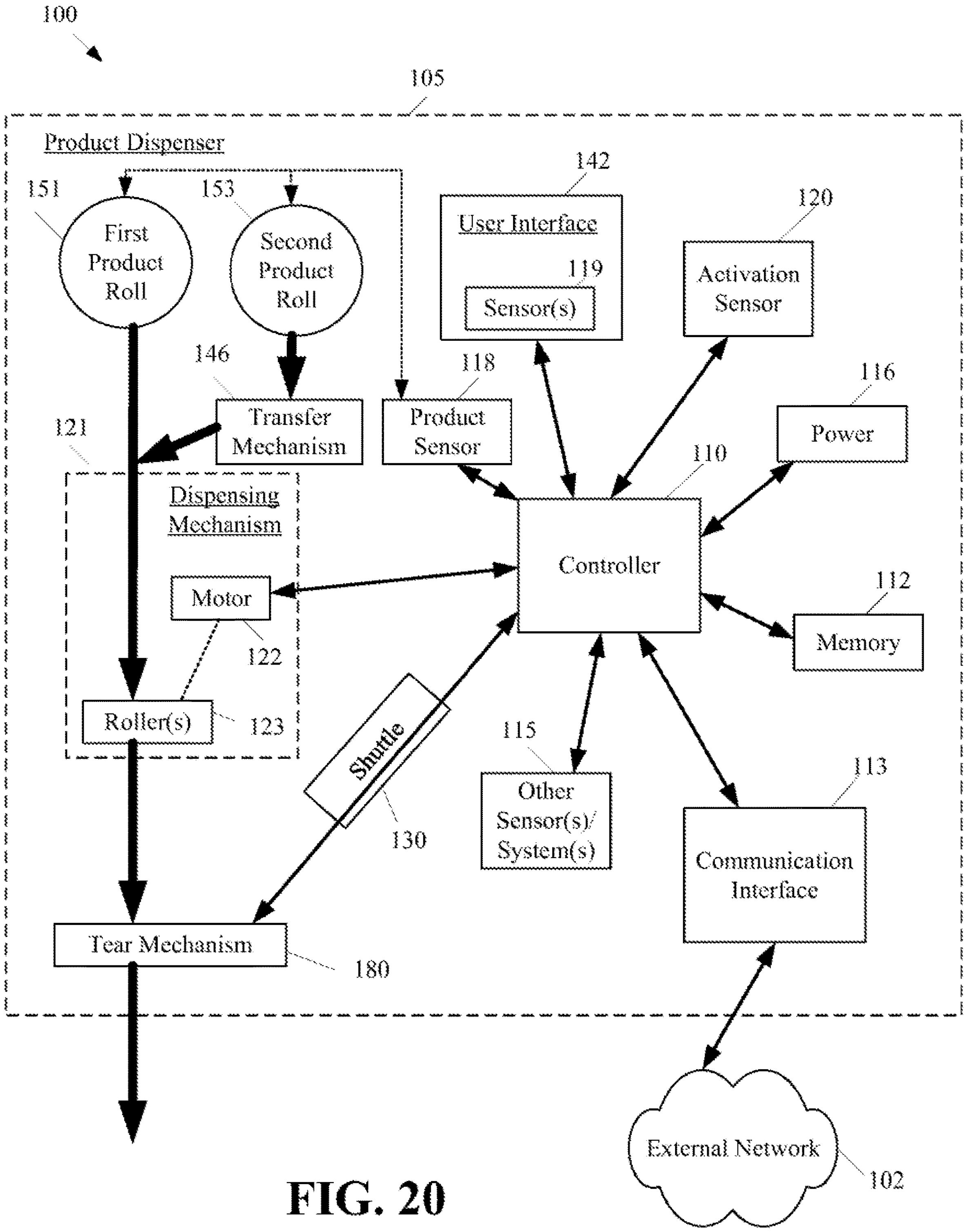
Figure 21:
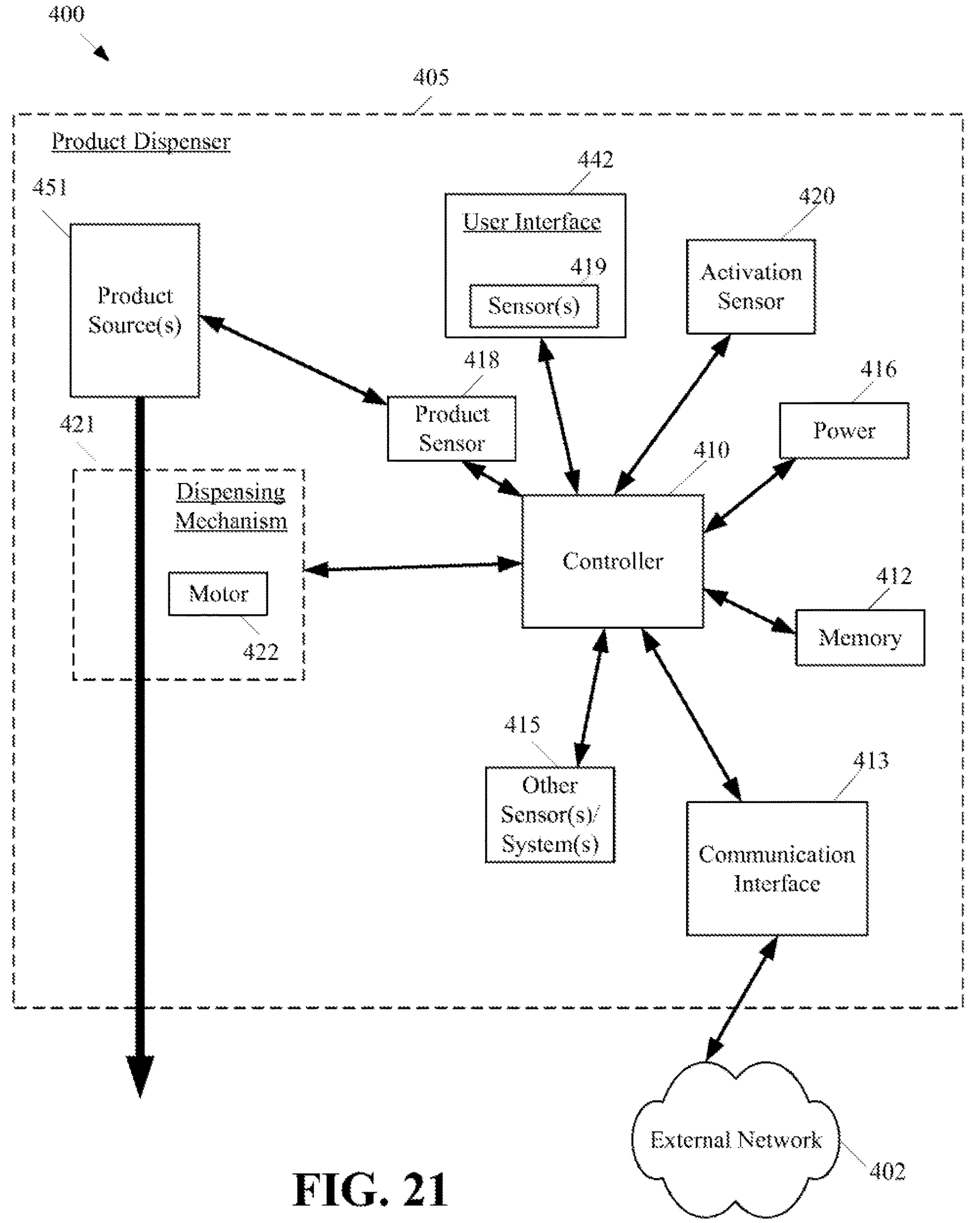
Figure 22:
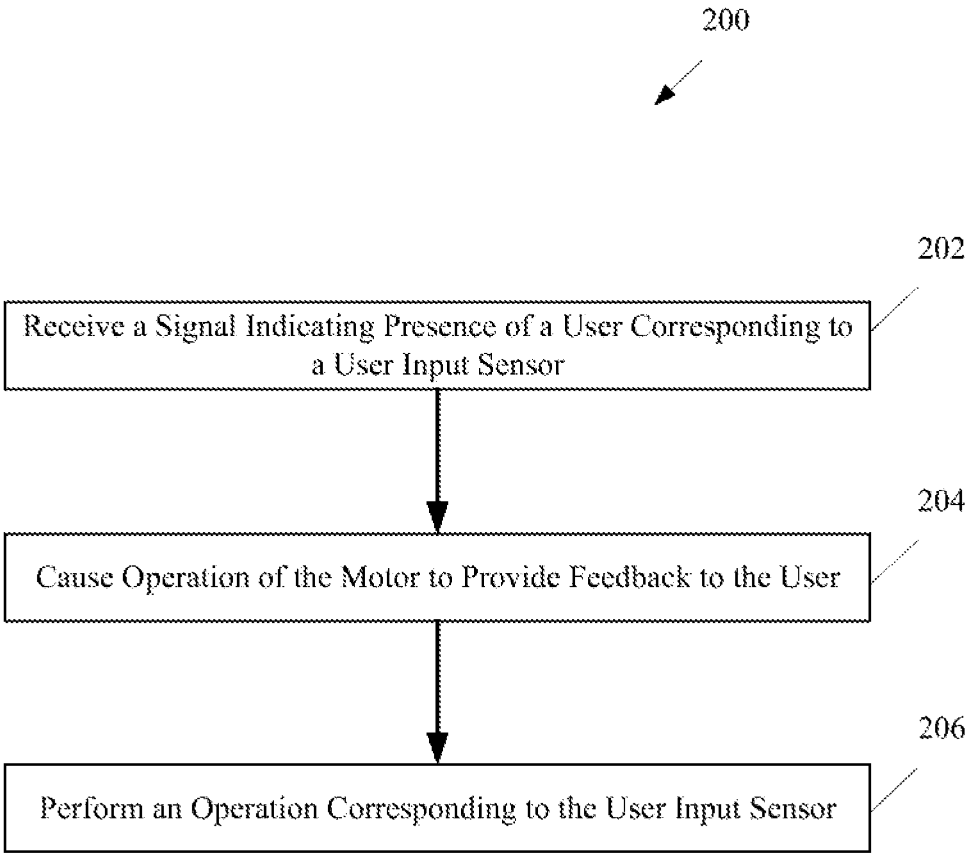

FIG. 17B shows a cross-sectional perspective view of the example user interface shown in FIG. 15, wherein the face plate of the user interface has been removed for illustrative purposes, in accordance with some embodiments discussed herein FIG. 18 shows a perspective view of the chassis shown in FIG. 15, with the face plate of the user interface removed for illustrative purposes, in accordance with some embodiments discussed herein;

FIG. 19 shows a partially transparent view of a portion of the chassis, illustrating an example motor for operating the dispensing mechanism of the dispenser, in accordance with some embodiments discussed herein;

FIG. 20 shows a block diagram illustrating an example sheet product dispenser, in accordance with some embodiments discussed herein;

FIG. 21 shows a block diagram illustrating an example product dispenser, in accordance with some embodiments discussed herein; and FIG. 22 illustrates a flowchart of an example method of controlling and operating an example product dispenser to provide feedback to a user, in accordance with some embodiments discussed herein.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

As used herein, a "user" of example product dispensers may be a maintainer (e.g., a maintenance person, a janitor, a facility manager, etc.) or a consumer (e.g., a person receiving a dispensed portion of the product).

As used herein, the term "product" may refer to any type of consumable or usable that can be dispensed. For example, product may include sheet product (e.g., napkin, tissue, wipes, paper towel, etc.), flowable material (e.g., soap, gel, liquid, lotion, foam, etc.), air freshener, cutlery, or other material. In some embodiments described herein, the term "product" may be modified, such as being referred to as "sheet product". Unless otherwise specified, where appropriate and as appreciated by one of ordinary skill in the art in view of this disclosure, various embodiments of the present invention may be used with different types of product.

As used herein, the term "sheet product" may include a product that is relatively thin in comparison to its length and width. Further, the sheet product may define a relatively flat, planar configuration. In some embodiments, the sheet product is flexible or bendable to permit, for example, folding, rolling, stacking, or the like. In this regard, sheet product may, in some cases, be formed into stacks or rolls for use with various embodiments described herein. Some example sheet products include towel, bath tissue, facial tissue, napkin, wipe, wrapping paper, aluminum foil, wax paper, plastic wrap, or other sheet-like products. Sheet products may be made from paper, cloth, non-woven, metallic, polymer or other materials, and in some cases may include multiple layers or plies. In some embodiments, the sheet product (such as in roll or stacked form) may be a continuous sheet that is severable or separable into individual sheets using, for example, a tear bar or cutting blade. Additionally or alternatively, the sheet product may include predefined areas of weakness, such as lines of perforations, that define individual sheets and facilitate separation and/or tearing. In some such embodiments, the lines of perforations may extend along the width of the sheet product to define individual sheets that can be torn off by a user.

As indicated herein, some embodiments of the present invention may be utilized with a sheet product dispenser. For example, certain described embodiments herein may be utilized with paper towel dispensers. In some example embodiments, paper towel dispensers may have components (e.g., roll holders, a lever, a motor, a controller, a drive roller, a pinch roller, etc.) that can be utilized to receive the supply of product (e.g., a roll of sheet product, a stack of sheet product) and facilitate dispensing from the dispenser. Additional information regarding automated and non-automated paper towel dispensers, including components and functionality thereof, can be found in U.S. Pat. Nos. 7,270,292, 5,441,189, 9,999,326, 6,871,815, each of which are assigned to the owner of the present invention and incorporated by reference in their entireties. Some example embodiments may be utilized with paper towel dispensers that are designed to utilize perforated roll towel. Example systems and functions of some such dispensers can be found in U.S. Pat. Nos. 7,887,005, 8,632,030, 9,474,422, and 9,642,503, each of which are assigned to the owner of the present invention and incorporated by reference in their entireties.

Some example embodiments herein may be utilized with tissue product dispensers. In such example embodiments, the tissue dispenser may have components (e.g., roll holders, a rotary mechanism, a motor, a controller, a drive roller, a pinch roller, etc.) that can be utilized to receive the supply of product (e.g., a roll of sheet product) and facilitate dispensing from the dispenser. Additional information regarding example tissue product dispensers, including components and functionality thereof, can be found in U.S. Pat. Nos. 8,162,252 and 7,861,964, both of which are assigned to the owner of the present invention and incorporated by reference in their entireties. Similarly, certain described embodiments herein may be utilized with napkin product dispensers. In such example embodiments, the napkin dispenser may have components (e.g., roll holders, a motor, a controller, a drive roller, a pinch roller, etc.) that can be utilized to receive the supply of product (e.g., a roll of sheet product) and facilitate dispensing from the dispenser. Additional information regarding example napkin product dispensers, including components and functionality thereof, can be found in U.S. Pat. No. 9,604,811, which is assigned to the owner of the present invention and incorporated by reference in its entirety.

Also as indicated herein, some embodiments of the present invention may be utilized with other types of product dispensers. For example, certain described embodiments herein may be utilized with cutlery product dispensers. In such example embodiments, the cutlery dispenser may have components (e.g., a lever, a motor, a controller, a dispensing mechanism, etc.) that can be utilized to receive the supply of product (e.g., a stack of cutlery) and facilitate dispensing from the dispenser. Additional information regarding example cutlery product dispensers, including components and functionality thereof, can be found in U.S. Pat. No. 9,237,815, which is assigned to the owner of the present invention and incorporated by reference in its entirety. As another example, certain described embodiments herein may be utilized with skincare product dispensers, such as may dispense flowable material (e.g., soap, gel, liquid, lotion, foam, etc.). In such example embodiments, the skincare product dispenser may have components (e.g., a reservoir, a cartridge, a lever, a motor, a pump, a controller, etc.) that can be utilized to receive the supply of product (e.g., a reservoir of the product) and facilitate dispensing from the dispenser. Additional information regarding example skincare product dispensers, including components and functionality thereof, can be found in U.S. Pat. No. 8,746,510, which is assigned to the owner of the present invention and incorporated by reference in their entireties. As yet another example, certain described embodiments herein may be utilized with air freshener product dispensers. In such example embodiments, the air freshener dispenser may have components (e.g., a reservoir, a cartridge, a lever, a motor, a pump, a spray pump, a controller, etc.) that can be utilized to receive the supply of product (e.g., a reservoir of the product) and facilitate dispensing from the dispenser. Additional information regarding example air freshener product dispensers, including components and functionality thereof, can be found in U.S. Patent Application Publication No. 2016/0030620, which is assigned to the owner of the present invention and incorporated by reference in its entirety.

Figure 1:
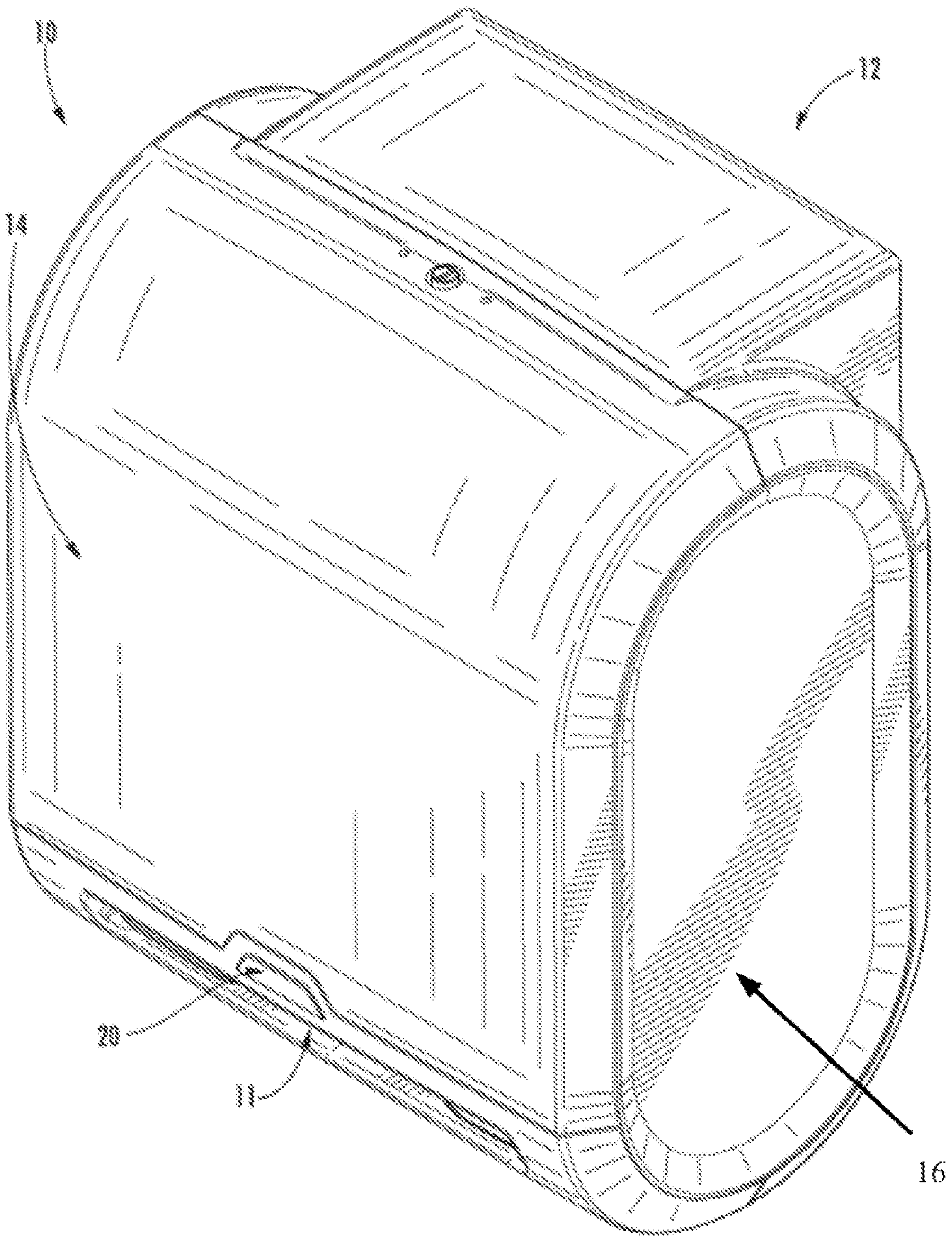
FIG. 1 shows a perspective view of an example sheet product dispenser, in accordance with some embodiments discussed herein.

FIG. 1 illustrates an example sheet product dispenser 10 according to some embodiments of the present invention, such as in accordance with the sheet product dispenser 105 and its corresponding components described with respect to FIG. 20. The sheet product dispenser 10 includes a housing defined by a base portion 12 and a cover 14. The sheet product dispenser 10 includes at least one dispensing slot 11 where the sheet product (e.g., paper towel) is provided to the user. Such sheet product may, such as described herein, be dispensed in response to user input being provided to an activation sensor 20 (e.g., in the circumstance where the sheet product dispenser is automated).

Figure 2:
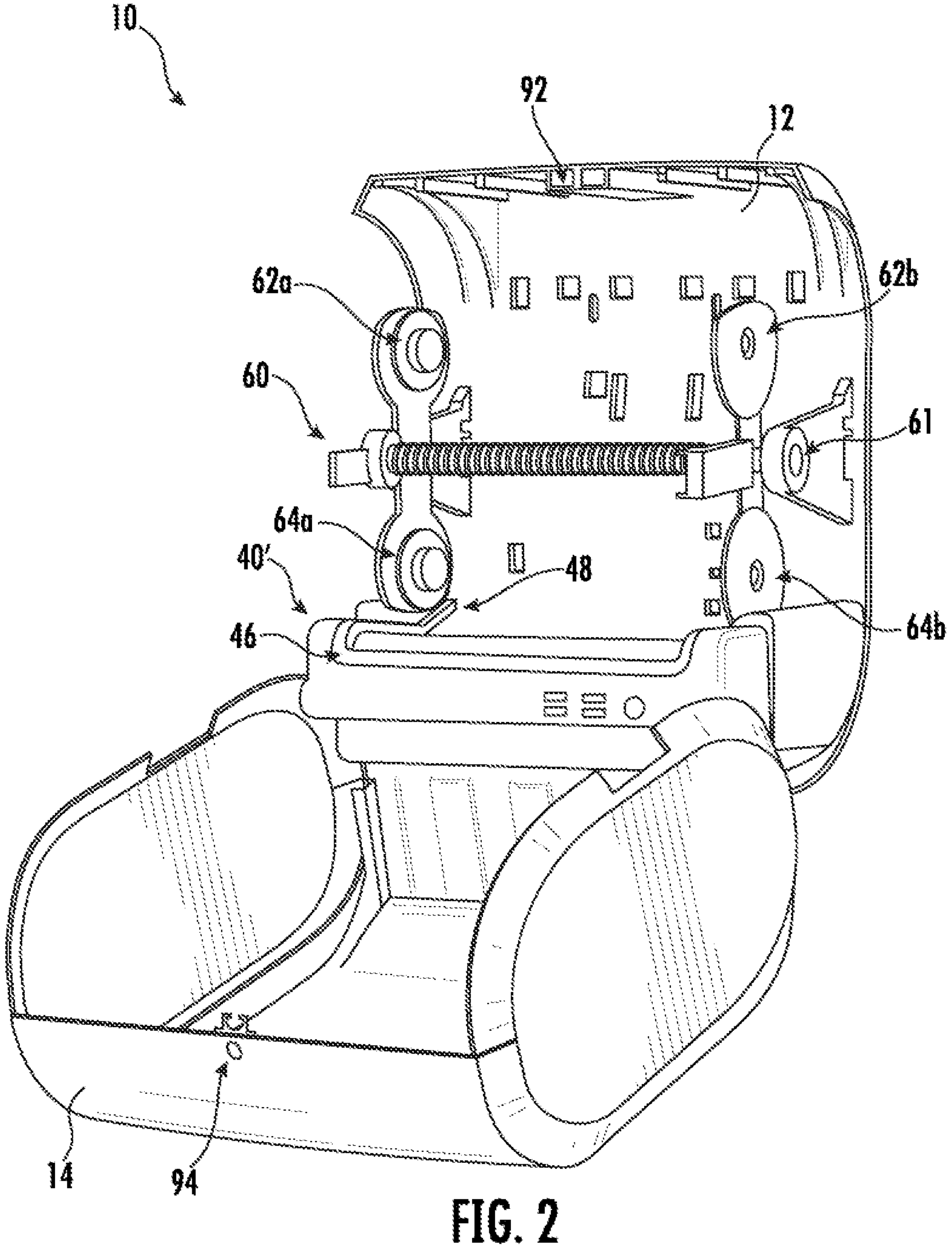
FIG. 2 shows a perspective view of the example sheet product dispenser shown in FIG. 1, with the cover in an open position, in accordance with some embodiments discussed herein.

FIG. 2 illustrates the sheet product dispenser 10 with the cover 14 in an open position, revealing some internal components of the sheet product dispenser 10. The cover 14 may be attached to the base portion 12 and configured to be moved between an open position (shown in FIG. 2) and a closed position (shown in FIG. 1). In some embodiments, the cover 14 may remain attached to the base portion 12 while moving between the closed position and the open position. For example, in the illustrated embodiment, the cover 14 is rotatably attached to the base portion 12 around an axis near a bottom of the base portion 12 (although other opening configurations are contemplated—e.g., the cover 14 opens upwardly, off to either side, etc.).

In order to the open the cover 14, in some embodiments, a maintainer may operate a latch 94 that disengages from a latch receiving portion 92. In some embodiments, the latch 94 may be locked so as to restrict access to the internal components of the sheet product dispenser 10.

The sheet product dispenser 10 includes a first set of roll holders 62*a*, 62*b* and a second set of roll holders 64*a*, 64*b*. While shown without an installed product roll, each set of roll holders may be utilized to install a product roll for holding thereon. For example, a maintainer may slightly separate the second set of roll holders 64*a* and 64*b* to slide in a product roll. The same procedure could be repeated for the first set of roll holders 62*a* and 62*b*. Depending on the sizing of the housing 16, the sheet product dispenser 10 may be configured to hold two full product rolls or one full product roll and one stub product roll (e.g., the product roll has less than a full amount of sheet product). Alternatively, some embodiments of the present invention may be utilized with sheet product dispensers designed to hold one product roll or more than two product rolls. In some embodiments, other types of sheet product sources may be utilized besides rolls of sheet product. For example, the sheet product may be provided in stacked form. The stacks may form a continuous web (e.g., perforated or unperforated) or may be separated and, in some cases, interleaved.

The sheet product dispenser 10 may also include a carriage 60 that is configured to enable physical movement of the sets of roll holders 62*a*, 62*b* and 64*a*, 64*b*. In the illustrated embodiment, the carriage 60 is configured to rotate about an axis 61 to switch physical positions of the sets of roll holders. In this regard, the carriage 60 may be operated by a maintainer to rotate and, therefore, re-position an installed product roll—such as to the position of the second set of roll holders 64*a*, 64*b* shown in FIG. 2. This may occur after a transfer mechanism 46 has changed dispensing from the first product roll to a replacement product roll.

When loading the sheet product dispenser 10, the maintainer may open the cover 14 (such as shown in FIG. 2). When opened, if the transfer has already occurred, there may be an empty product roll in the second set of roll holders 64*a*, 64*b* and a partially-used product roll installed in the first set of roll holders 62*a*, 62*b*. The leading edge of the partially-used product roll may be installed in a dispensing mechanism (e.g., dispensing mechanism 21 shown in FIG. 4) and may be utilized for providing a dispensed portion of the sheet product. The maintainer may then rotate the carriage to reposition the partially-used product roll into the bottom position, freeing up the ability to remove the empty product roll (now at the top) and replace it with a full product roll. Then, the leading edge of the replacement product roll may be feed into the transfer mechanism 46 (e.g., folded underneath the transfer mechanism). With the replacement product roll installed, the cover 14 may be closed and the sheet product dispenser is ready for operation.

Figure 4:
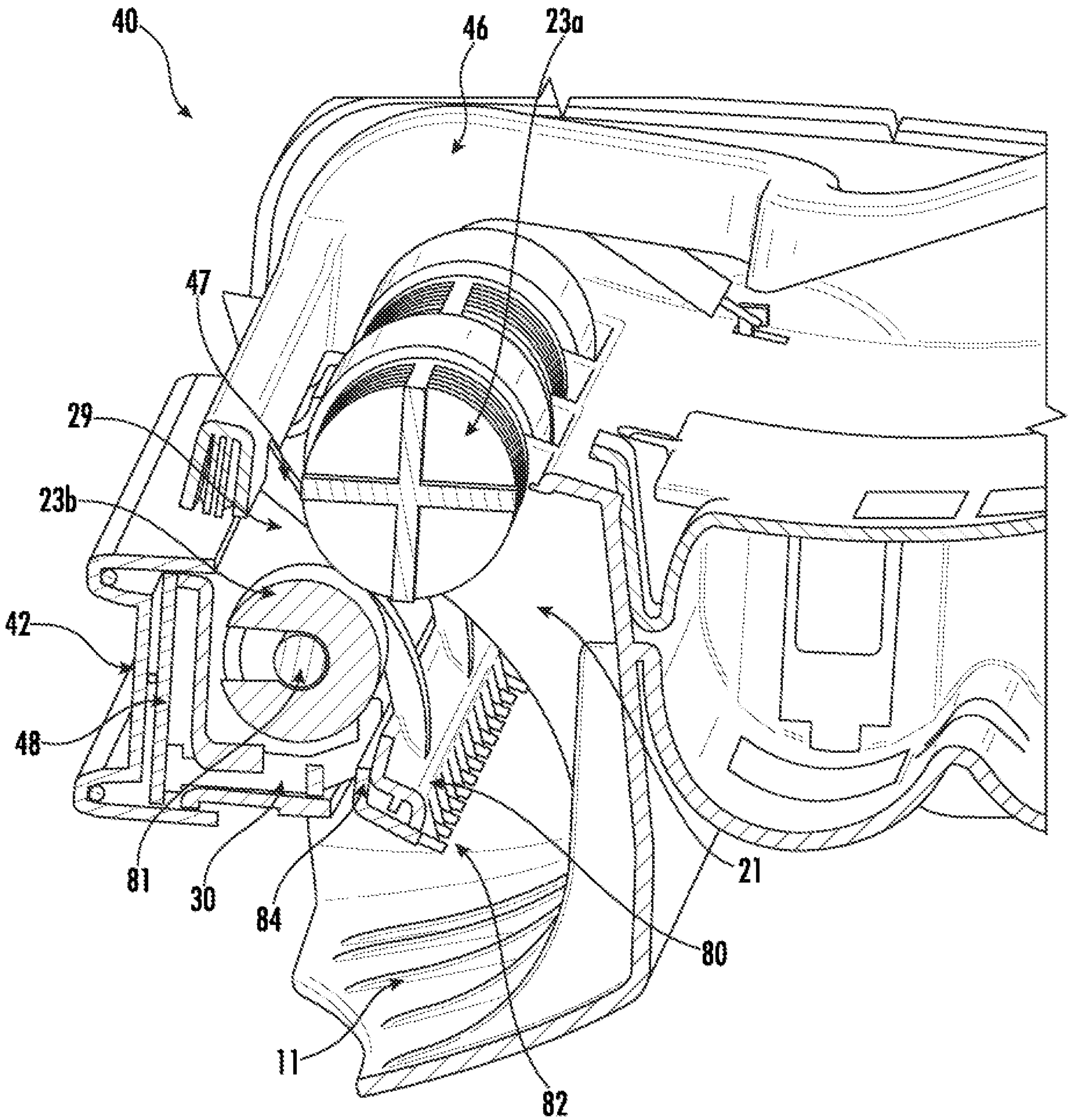
FIG. 4 shows a cross-sectional view of the chassis taken along line 4-4 in FIG. 3, in accordance with some embodiments discussed herein.

Referring to FIG. 4, the transfer mechanism 46 may include a tucker element 47 that tucks the leading edge of the replacement roll into a nip 29 of a drive roller 23*b* and a pinch roller 23*a* of the dispensing mechanism 21 upon sufficient depletion of the currently dispensed product roll. In this regard, the tucker element 47 may be movable between a disengaged position and an engaged position. A product sensor arm 48 may rest on the product roll installed at the bottom position (e.g., where the second set of roll holders 64*a*, 64*b* are shown). The product sensor arm 48 may rest against the outer surface of the product roll and once a certain amount of product on the installed product roll is depleted, the product sensor arm 48 is biased to move the tucker element 47 into the engaged position to feed the leading edge of the replacement product roll into the dispensing mechanism to initiate the transfer. Notably, the above described transfer mechanism 46 is described as an example, as other transfer mechanisms are contemplated by various example embodiments. Similarly, in some embodiments, a controller of the sheet product dispenser 10 may be configured to cause transfer to occur in response to determining that the amount of sheet product on the current product roll drops below a threshold level.

Figure 3:
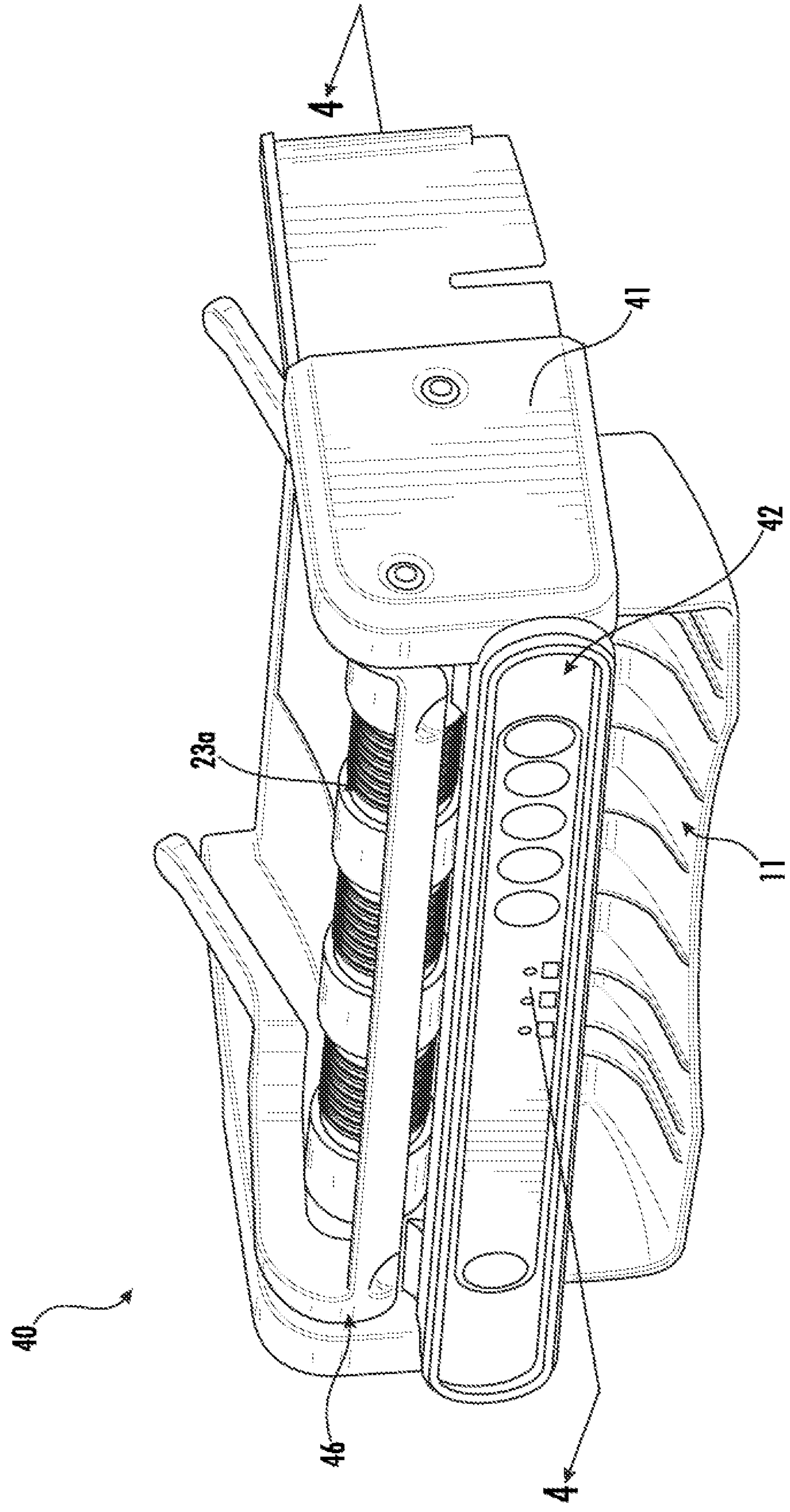
FIG. 3 shows an example chassis for an example sheet product dispenser, in accordance with some embodiments discussed herein.

In some embodiments, various components of the sheet product dispenser 10 may be formed within a chassis 40 that can be installed within the housing 16 of the sheet product dispenser 10. An example chassis 40' is shown in FIG. 2. Another example chassis 40 is shown in FIG. 3. The chassis 40 may form a part that may be installed within the sheet product dispenser 10. In this regard, should maintenance be required, the chassis 40 can be removed altogether and replaced with another chassis without having to replace the entire sheet product dispenser 10. Utilizing such a chassis 40 also creates easier assembly of the sheet product dispenser 10.

Referring to FIG. 3, the chassis 40 may include a housing 41 that, at least, partially contains and/or enables mounting of various components thereto. The housing 41 may be formed of a semi-rigid plastic. A user interface 42 may face forward from the chassis 40 and include various user input features and/or displays (described in greater detail herein). With reference to FIG. 4, the chassis 40 may also include the dispensing mechanism 21 and the transfer mechanism 46. A paper pathway of the chassis 40 may lead from a nip 29 (between a drive roller 23*b* and a pinch roller 23*a*) to the end of a dispensing chute 11 where the dispensed portion of the sheet product is presented (including where a portion of the dispensed portion is maintained within the dispensing chute 11, but downstream of the nip 29).

With reference to FIG. 19, when a leading edge of the product roll is installed within the nip 29, a motor 22 may be operated to drive rotation of gears 27 to rotate the drive roller 23*b*. Rotation of the drive roller 23*b* along with the friction between the sheet product and the nip 29 (where the drive roller 23*b* and pinch roller 23*a* have sandwich the sheet product) causes the sheet product to move along the paper path and be presented within the dispensing chute 11. Depending on the settings of the sheet product dispenser, a predetermined length of sheet product will be dispensed through the dispensing mechanism 21 and presented to a user for retrieval.

Returning to FIG. 4, once a dispense operation is complete, a dispensed portion of the sheet product will be present within the dispensing chute 11 (the sheet product is not shown in FIG. 4). The sheet product dispenser 10 includes a tear mechanism 80 that can then be used to facilitate removal of the dispensed portion. In this regard, the illustrated tear mechanism 80 (e.g., a tear bar) includes serrated teeth 82 that face into the paper pathway within the dispensing chute 11. A user may pull on the dispensed portion (e.g., the portion hanging outside the dispensing chute 11) and as the user pulls, the sheet product may rub against the serrated teeth 82 to cause the sheet product to tear therealong for formation of a dispensed sheet of sheet product. While the above described example utilizes serrated teeth, other tear features are contemplated and the sheet product may or may not include lines of perforations.

It may be desirable for various embodiments to determine when the dispensed portion of sheet product has been removed from the dispensing chute. Such information may be useful for various functions and/or data collection corresponding to the sheet product dispenser. For example, determining if a dispensed sheet has been removed may enable a more accurate estimate of the amount of product remaining on the dispensing product roll. As another example, the determination may be used to enable "hang mode" operation where a dispensed portion is automatically dispensed upon removal of a prior "hanging" dispensed portion. Such a "hang mode" may enable reduced power consumption, as there is no need for the activation sensor to be continuously "looking" for a user to initiate a dispense. Other examples for usefulness of the information include determining if a jam has occurred, determining when the tear occurrence happened (e.g., with a timer), among other things.

There may be various ways to determine a product removal (e.g., tear) occurrence in various embodiments of the present invention. For example, a dedicated sensor, such as an infrared sensor, may be positioned to sense whether sheet product is present within certain portions of the dispensing chute 11. Another example is to utilize a switch that can be triggered when a tear mechanism is operated (thereby signaling the tear occurrence and removal of the dispensed sheet). Notably, however, past tear switch determinations were limited in the location of where the switch was placed and often required extra components (e.g., a secondary printed circuit board, wiring, etc.) to communicate the tear occurrence to the main controller. This increased the number of parts and, therefore, increased costs, manufacturing complexity, and assembly complexity. Further, the placement of the switch proximate the tear bar increased risk of damage to the switch due to excessive force application on the tear bar and inaccurate readings from dust building up within the sensor (as the sensor was near where the paper towel rubbed on the tear bar).

With the above in mind, some example embodiments provide an improved produce removal occurrence determination feature for sheet product dispensers. For example, a shuttle 30 (e.g., a tear switch shuttle) is used to link the physical force used to tear the dispensed sheet with contacting a switch mounted directly on the main printed circuit board (PCB) 48. Such a shuttle enables positioning the switch further from the paper pathway, as well as providing a structure that enables management of the forces applied to the switch (which could be excessive when a user applies too much force to remove the dispensed portion). Further, the shape and size of the shuttle can be adjusted to the particular components of the product dispenser.

Figure 5:
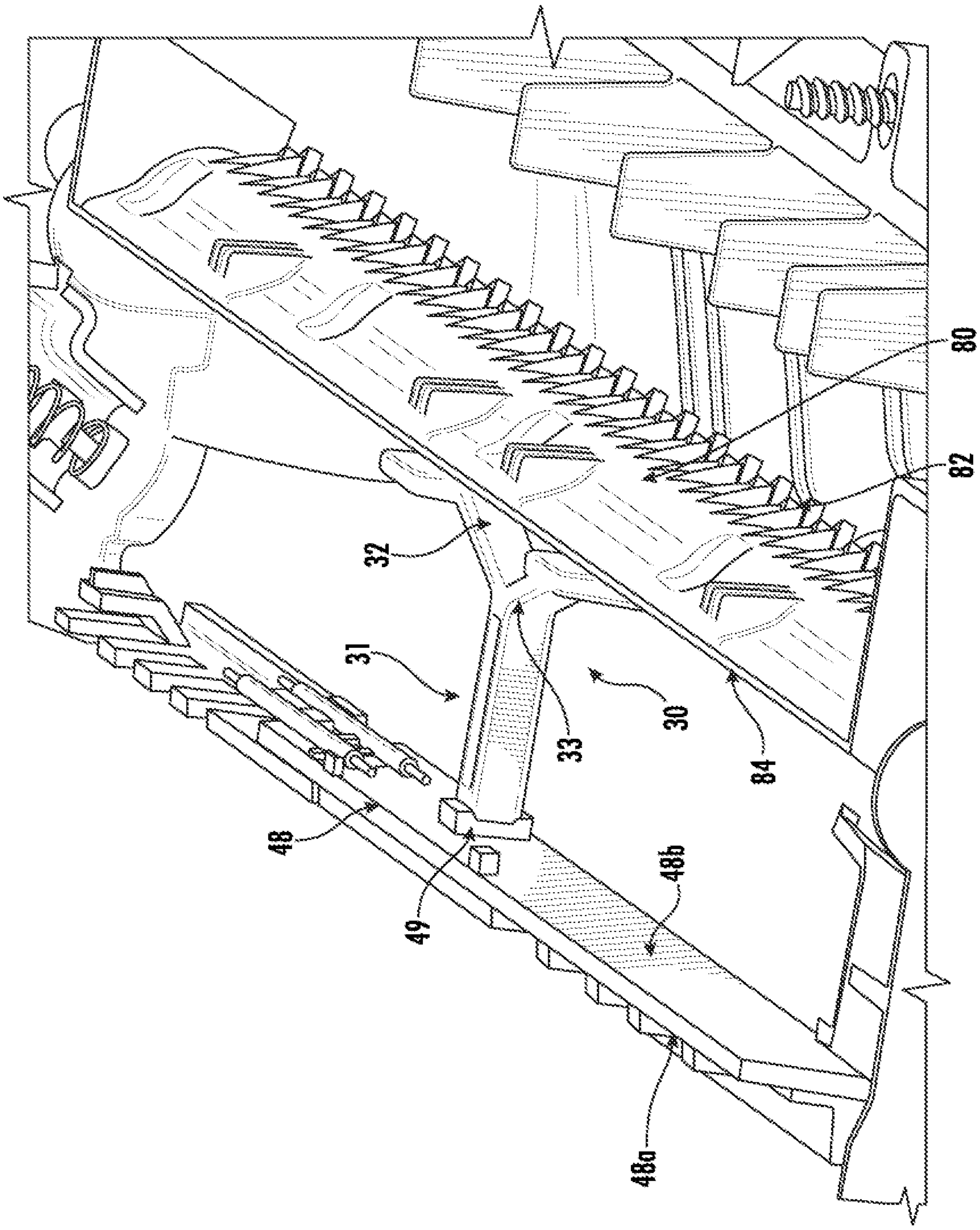
FIG. 5 shows an example shuttle positioned between a tear bar and a switch mounted on a printed circuit board, in accordance with some embodiments discussed herein.
Figure 6:
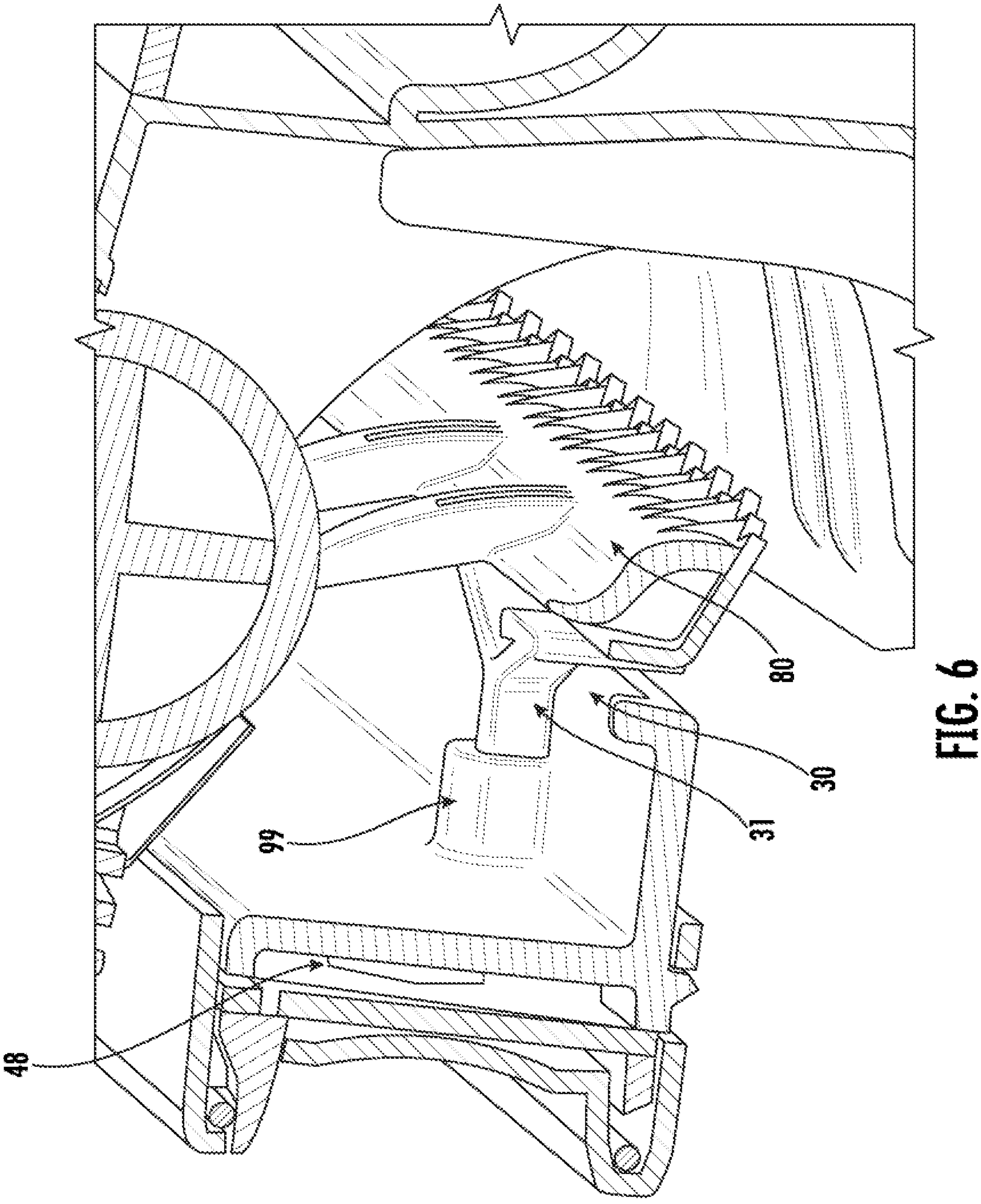
FIG. 6 shows a cross-sectional view of a portion of the chassis, illustrating the shuttle positioned within a slot in the chassis, in accordance with some embodiments discussed herein.
Figure 7:
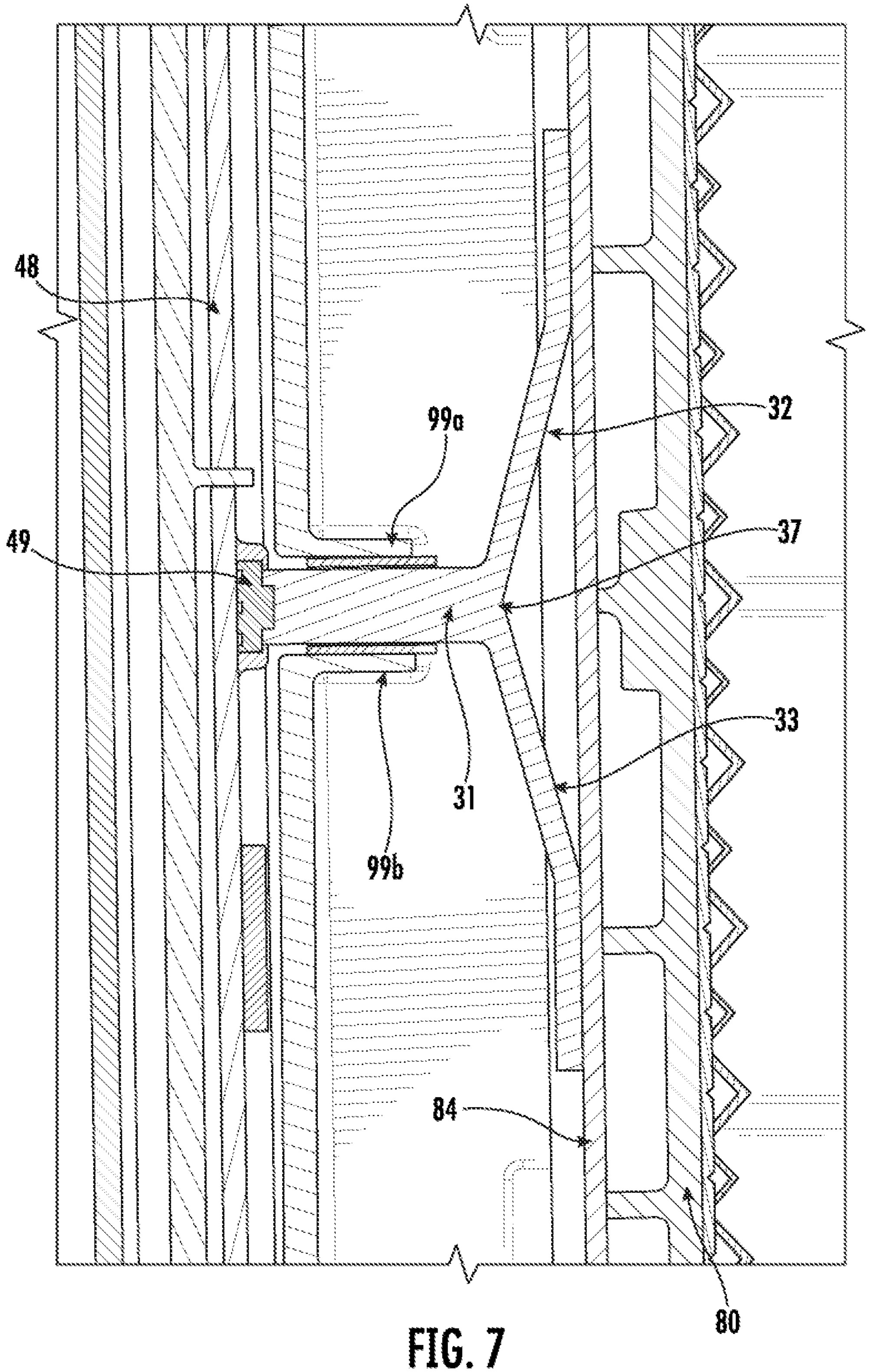
FIG. 7 shows a cross-sectional top view of the chassis illustrating the shuttle, in accordance with some embodiments discussed herein.
Figure 8:
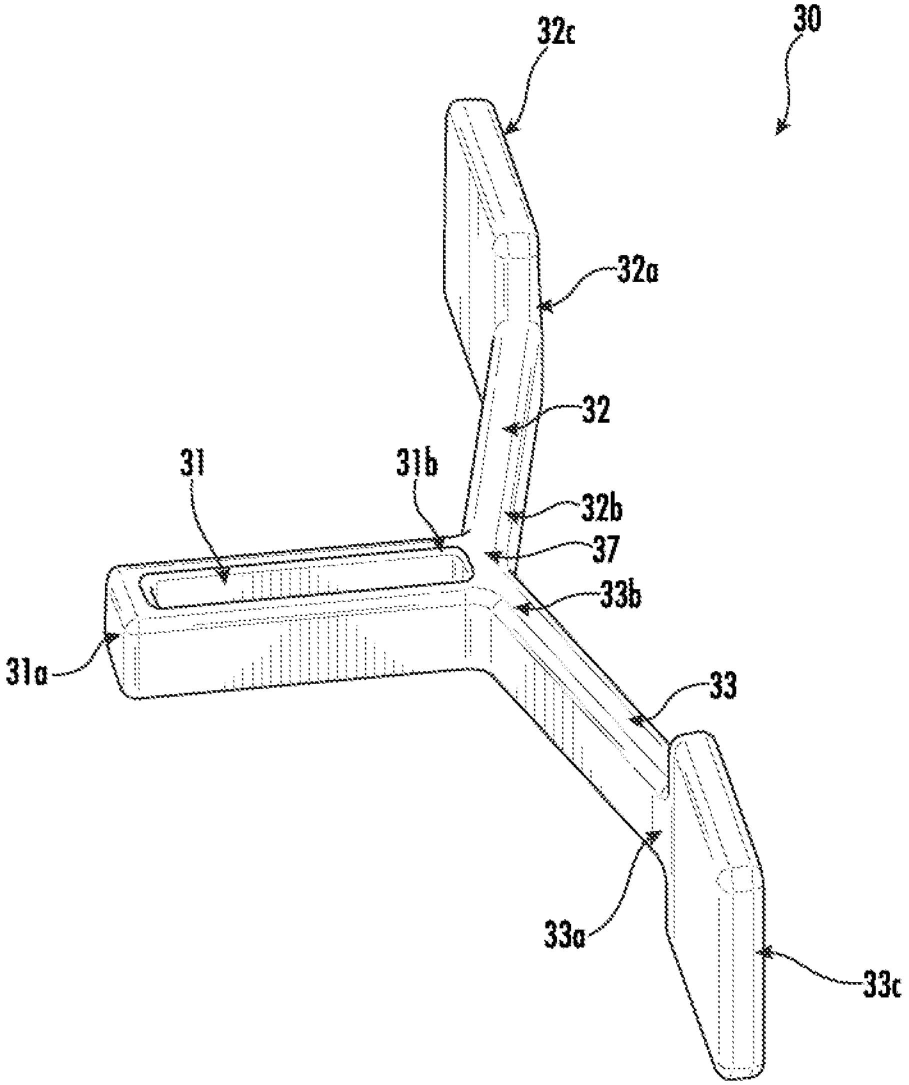
FIG. 8 shows a perspective view of an example shuttle, in accordance with some embodiments discussed herein.

With reference to FIGS. 5-7, a shuttle 30 may be positioned between a tear mechanism 80 and a switch 49 mounted on the main PCB 48. FIG. 8 shows the example shuttle 30. In the illustrated embodiment, the shuttle 30 defines a body formed of a first arm 32, a second arm 33, and a third arm 31. The first arm 32 and the second arm 33 extend from a second, proximal end 31*b* of the third arm 31 at point 37—forming a "Y" shape. In this regard, the first arm 32 and the second arm 33 extend from the third arm 31 in different directions, but generally toward a back portion 84 of the tear mechanism 80 (shown in FIGS. 4-6). As noted herein, the first arm 32 and the second arm 33 include first ends 32*a*, 33*a* that are designed to abut the back portion 84 of the tear mechanism 80. By extending in different directions from the third arm 31, those ends 32*a*, 33*a* are spaced apart along the back portion 84 of the tear mechanism 80—which creates increased reliability (such as in case a user pulls on one side of the dispensed portion more than the other). The third arm 31 further includes a first, distal end 31*a* that is designed to interact with and actuate the switch 49 mounted on the main PCB 48 when a tear occurs.

The first arm 32 extends from a first, distal end 32*a* to a second, proximal end 32*b* that is connected to the second, proximal end 31*b* of the third arm 31. Additionally, in the illustrated embodiment, the first end 32*a* includes a pad 32*c* that provides an increased surface area for abutting against the back portion 84 of the tear mechanism 80.

Similarly, the second arm 33 extends from a first, distal end 33*a* to a second, proximal end 33*b* that is connected to the second, proximal end 31*b* of the third arm 31. Additionally, in the illustrated embodiment, the first end 33*a* includes a pad 33*c* that provides an increased surface area for abutting against the back portion 84 of the tear mechanism 80.

In some embodiments, the shuttle 30 may be formed of a single material. In other embodiments, the shuttle 30 may be formed of a plurality of materials. In some embodiments, one or more of the materials of the shuttle 30 may be flexible. In some embodiments, the shuttle may be formed separately from the tear bar. In other embodiments, the shuttle may be formed with the tear bar, or otherwise attached to the tear bar.

In some embodiments, the body of the shuttle 30 may be formed of resilient material configured to retain (e.g., return to) its original shape so as to the bias the shuttle 30 to its resting state (e.g., the relative position of the first arm 32 and the second arm 33 with respect to each other and the third arm 31). In some embodiments, such a bias may also bias the tear mechanism 80 back to the first position (such as described herein). In some embodiments, additional or other bias elements may be utilized for biasing the shuttle 30 to an unactuated position and/or the tear mechanism 80 to the first position.

Notably, in some embodiments, only one main body structure without arms (e.g., a bar element shape) may be used for the shuttle. Similarly, one arm or more than two arms may be used for the shuttle. In this regard, a key purpose of the shuttle is to bridge the gap between the tear mechanism and the switch mounted on the main PCB and facilitate actuation of the switch when the tear mechanism is used to tear the dispensed portion of sheet product. With the above in mind, in some embodiments, the shuttle 30 may be mounted within the chassis of the sheet product dispenser so as to enable movement between an unactuated position and an actuated position.

Figure 9:
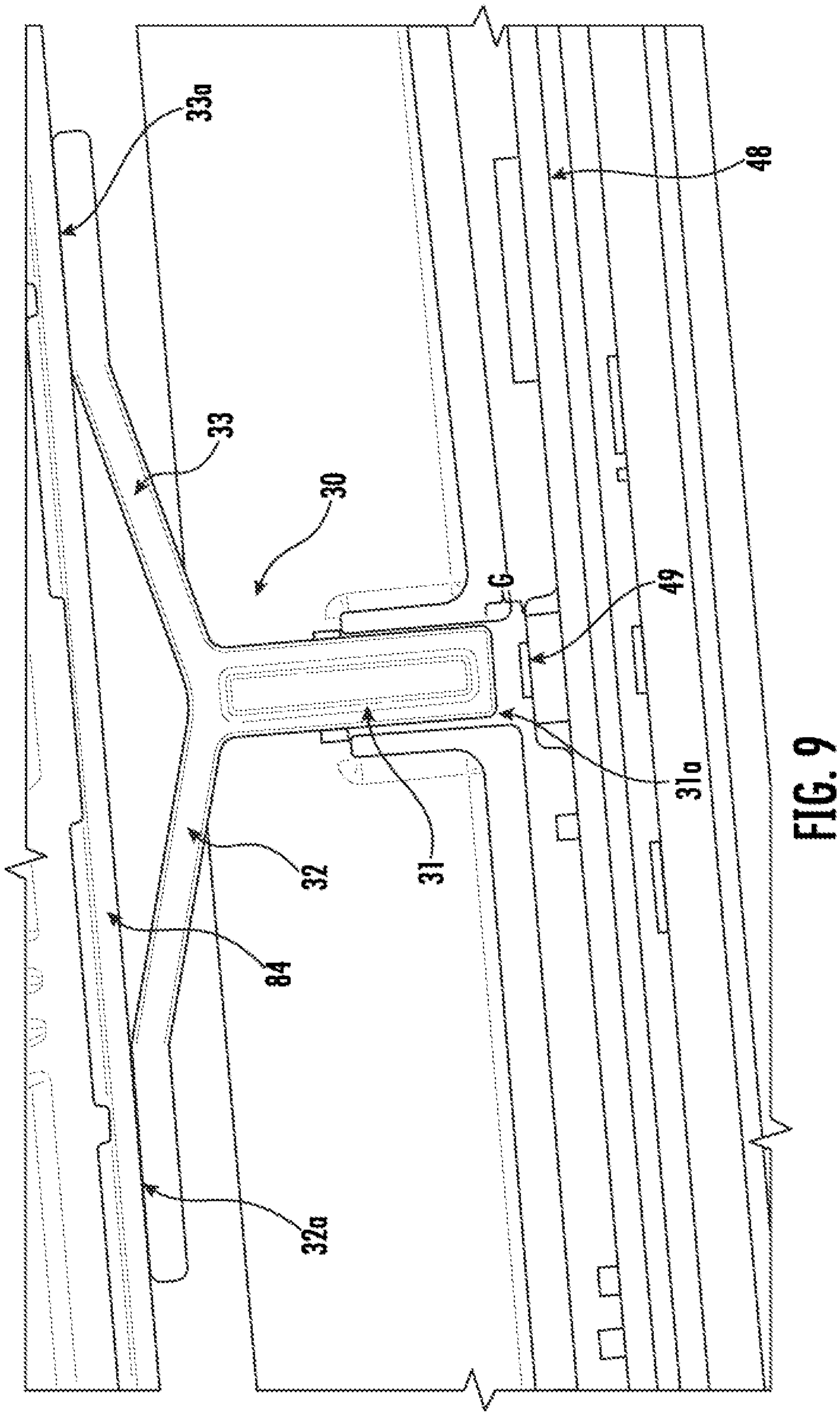
FIG. 9 illustrates an example shuttle in an unactuated position, in accordance with some embodiments discussed herein.

With reference to FIG. 9, when the shuttle 30 is in the unactuated position, the first, distal end 31*a* of the first arm 31 (e.g., the tear switch end of the shuttle 30) may be spaced apart from the switch 49 mounted to the main PCB 48—as illustrated by the gap G. In the illustrated unactuated position, the shuttle 30 is not contacting the switch 49. Accordingly, the switch 49 may be in an unactuated configuration—thereby indicating that product removal has not yet occurred. Notably, the unactuated position of the shuttle 30 also corresponds to the first position of the tear mechanism 80. In some embodiments, this is the main resting position of the tear mechanism 80 and corresponds to when the tear mechanism 80 extends, at least, partially into the paper pathway within the dispensing chute 11 and is ready to be used for tearing of the sheet product (e.g., once a dispensed portion is presented in the dispensing chute 11). In some embodiments, the shuttle 30 may define an unactuated position that includes contacting the switch 49, but without sufficient force needed to transition the switch 49 from the unactuated configuration to the actuated configuration.

Figure 11:
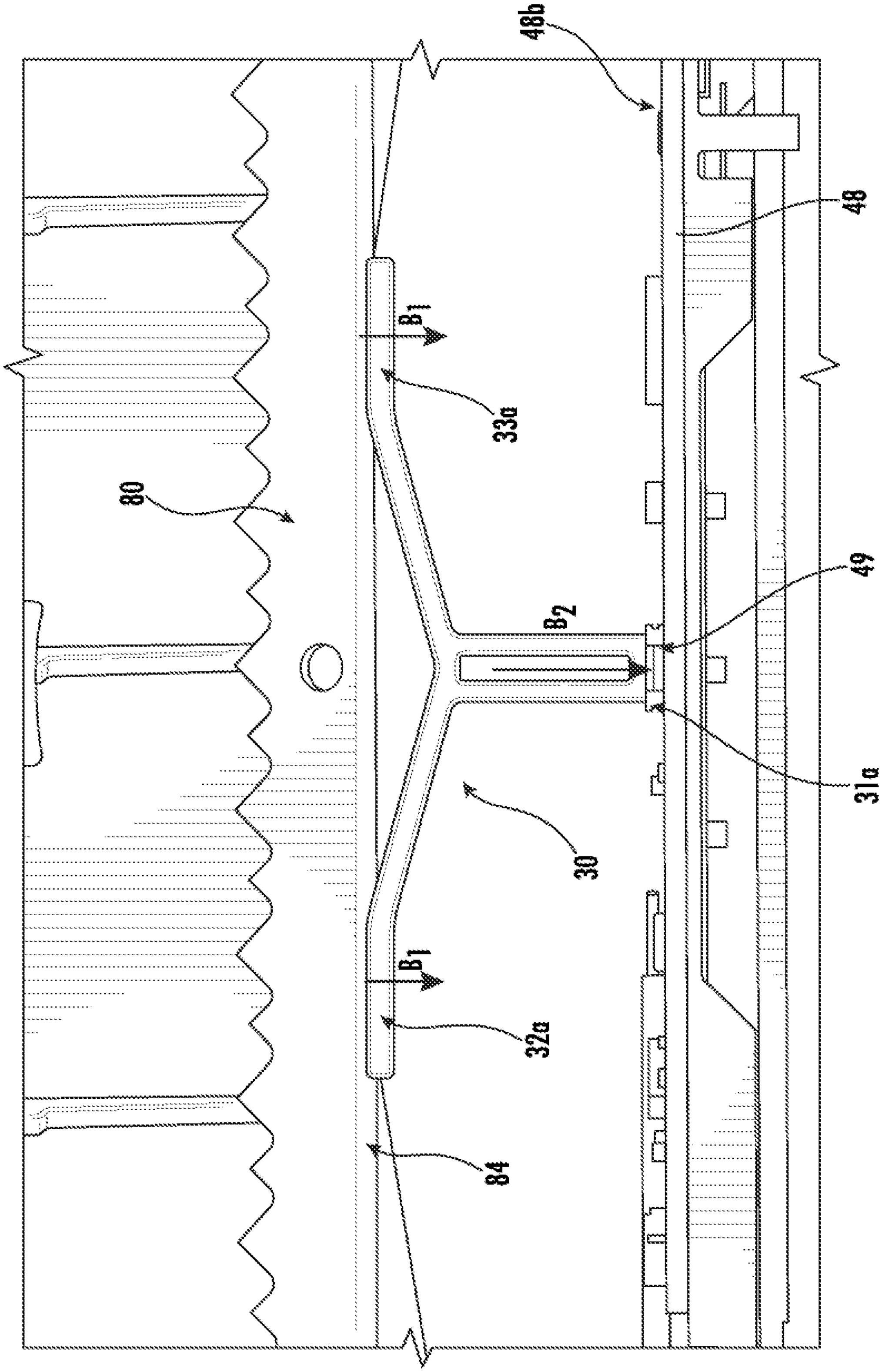
FIG. 11 shows the shuttle in an actuated position, in accordance with some embodiments discussed herein.

With reference to FIG. 11, when the shuttle 30 is in the actuated position, the first, distal end 31*a* of the first arm 31 (e.g., the tear switch end of the shuttle 30) contacts the switch 49 mounted on the main PCB 48 with sufficient force to transition the switch 49 to the actuated configuration to thereby indicate the occurrence of a tear of the dispensed portion. In this regard, when the shuttle 30 is in an unactuated position that is spaced apart from the switch 49, the shuttle 30 may have moved to close the gap G that was previously present. Likewise, when no such gap is present in the unactuated position, the shuttle 30 may still move enough to provide a force sufficient enough to transition the switch 49 to the actuated configuration.

Figure 10:
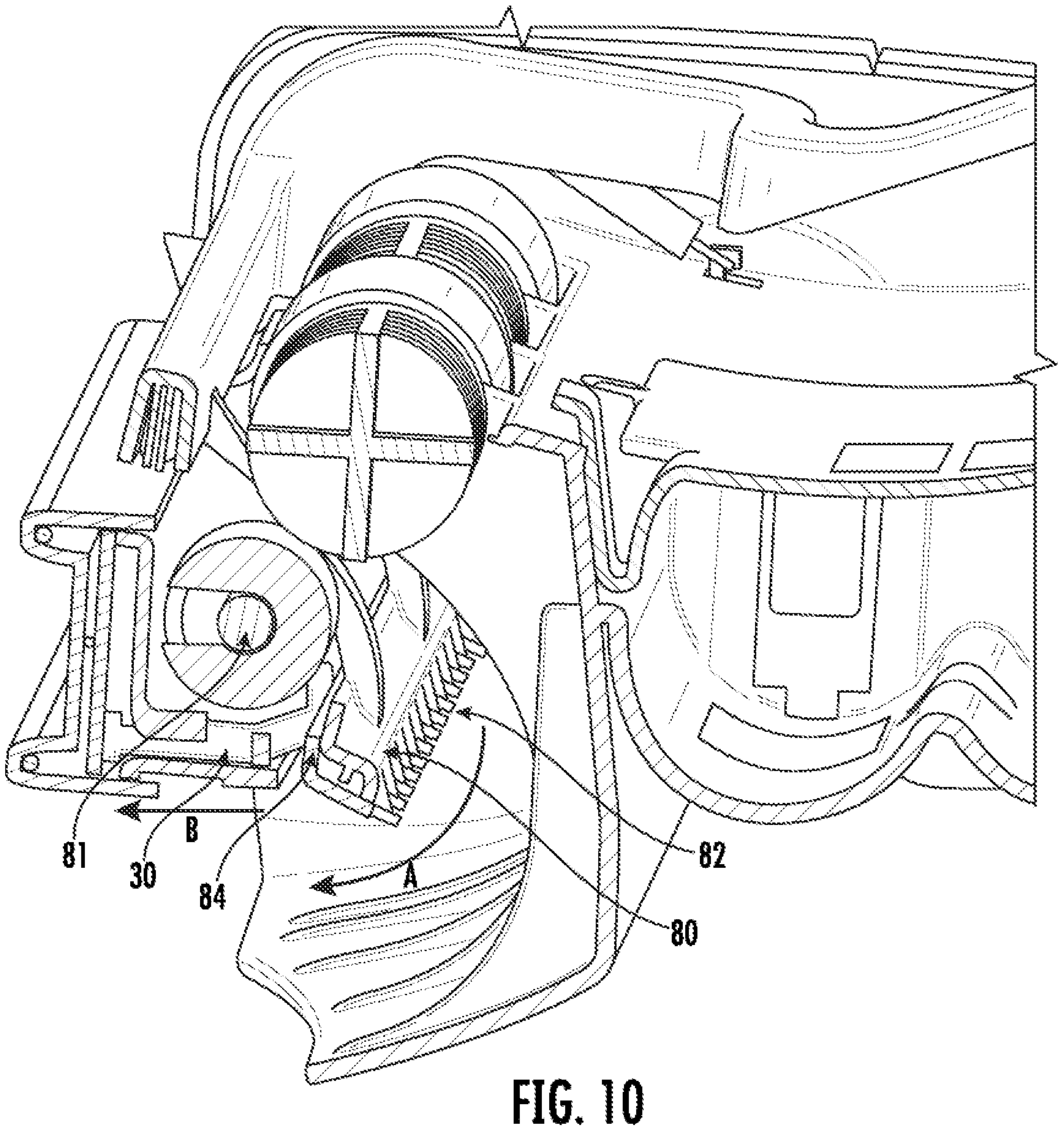
FIG. 10 shows a cross-sectional view of the chassis illustrating movement of the tear bar and shuttle, in accordance with some embodiments discussed herein.

Notably, as referenced herein, the tear mechanism 80 may be configured to move between a first position and a second position. In this regard, with reference to FIG. 10, the tear mechanism 80 may be configured to pivot about an axis 81 from a first position to a second position (e.g., along arrow A). This movement of the tear mechanism 80 from the first position to the second position may occur in response to a force applied by the user pulling on the dispensed portion of the sheet product against the serrated teeth 82 of the tear mechanism 80. As the user applies the force, the back portion 84 of the tear mechanism 80 pushes against the first, distal end 32*a* of the first arm 32 and the first, distal end 33*a* of the second arm 33 (each or both of which may be referred to as a tear bar end of the shuttle 30). As noted, the force may be applied against the pads 32*c* and 33*c* accordingly. As the tear mechanism 80 moves to the second position, the shuttle 30 may also move from the unactuated position to the actuated position (e.g., along arrow B). With reference back to FIG. 11, the corresponding forces of the back portion 84 of the tear mechanism 80 on the first arm 31 and the second arm 32 are illustrated as $B_1$. Those forces cause the movement of the shuttle 30 to the actuated position and also cause a second force $B_2$ to be applied from the tear switch end 31*a* onto the switch 49 to indicate the occurrence of the tear. Notably, in some embodiments, resistance forces from the switch 49/main PCB 48 and/or the resilient nature of the shuttle 30 may provide assisting resistance force that transfers to the tear mechanism 80 and works with the serrated teeth 82 to cause a tear to occur on the dispensed portion of the sheet product.

In some embodiments, the sheet product dispenser 10 (and/or the chassis 40) may define one or more guide slots 99 that are positioned within the dispenser and sized to movably fit the shuttle 30 therein (shown in FIG. 6). In this regard, the guide slot 99 is configured to direct movement of the shuttle 30 therein so that the switch end of the shuttle 30 contacts the switch 49 when the shuttle 30 moves from the unactuated position to the actuated position. In some embodiments, such as with reference to FIG. 7, the guide slot 99 may be formed of a first wall 99*a* and a second wall

99*b* that run along at least a portion of the longitudinal length of the third arm 31 so as to direct movement of the third arm 31.

Returning to FIGS. 4-5 and considering FIG. 3, a benefit of some such example embodiments is that only one main PCB 48 may be utilized and secondary PCBs are not required for the tear switch 49. In some embodiments, the main PCB 48 may be positioned within the sheet product dispenser 10 (and chassis 40) such that a second side 48*b* faces the shuttle 30 and the tear switch 49 is mounted to the second side 48*b*. Accordingly, a first side 48*a* may be utilized for various user input sensors 47*a*-*d* (shown in FIG. 17B) and other desirable sensors (e.g., the activation sensor 95 illustrated in FIG. 18), displays, and processing circuitry which may be desirable to have proximate and/or facing the front of the sheet product dispenser 10 (e.g., forming part of the user interface 42). Similarly, the main PCB (on either or both sides) could be used for the processing circuitry of the main controller for the dispenser (e.g., the controller used to cause operation of the motor to cause dispensing). In this regard, a single PCB could be used for all such functionality of the dispenser—thereby reducing parts.

Figure 12A:
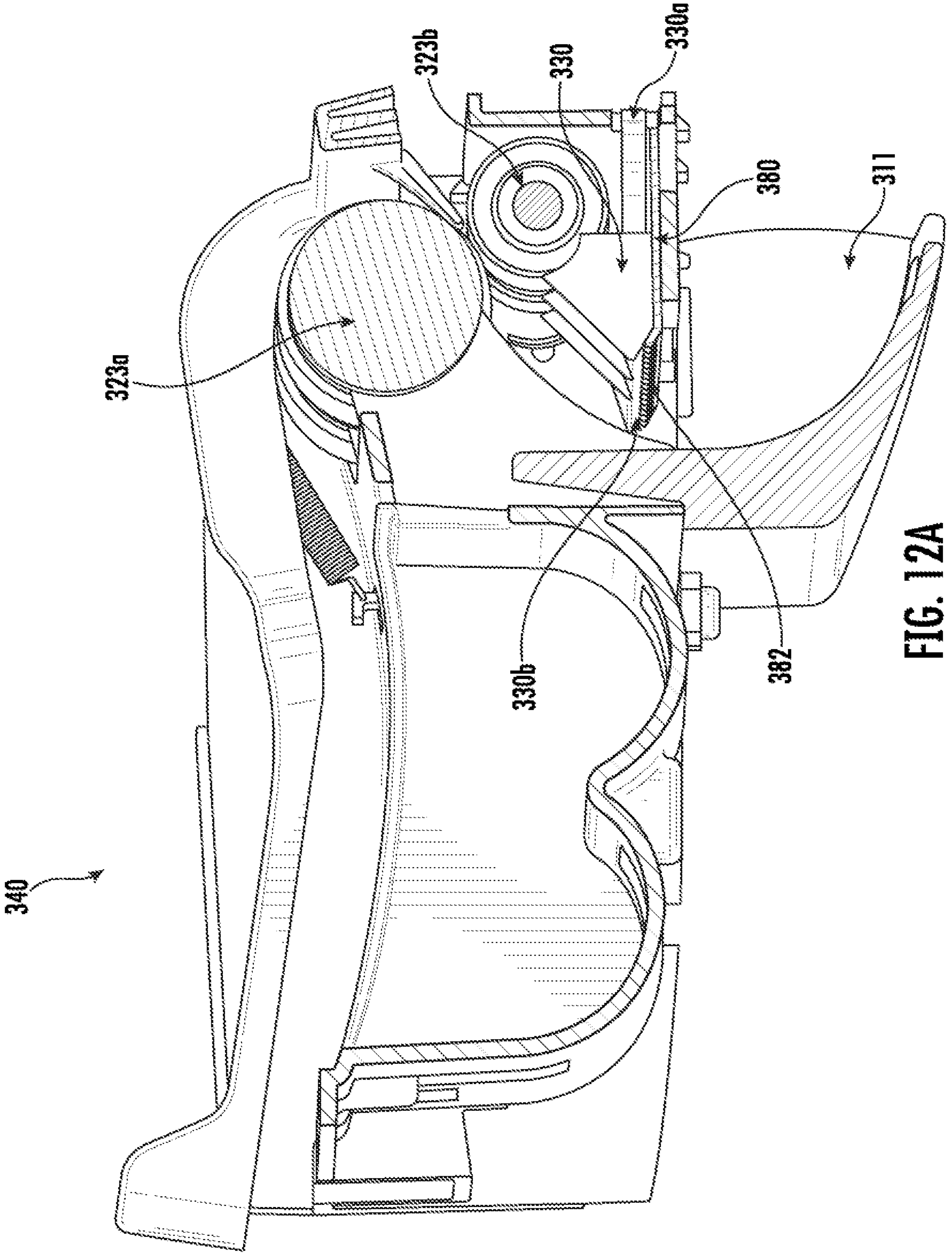
FIGS. 12A-12B show cross-sectional views of a portion of a chassis, where a fixed tear bar and a movable shuttle are shown, in accordance with some embodiments discussed herein.

In some embodiments, the tear bar may be fixed within the sheet product dispenser, and the shuttle may be movable via force applied from the sheet product separately from the tear bar. For example, with reference to FIG. 12A, the chassis 340 may include a dispensing mechanism with a drive roller 323*b* and pinch roller 323*a*. Further, a tear bar 380 may be fixedly attached to the chassis 340 and define a tear end 382 that may include various tear features (e.g., serrated edges) for encouraging tearing of the sheet product. Additionally, the chassis 340 may include a dispensing chute 311.

Figure 12B:
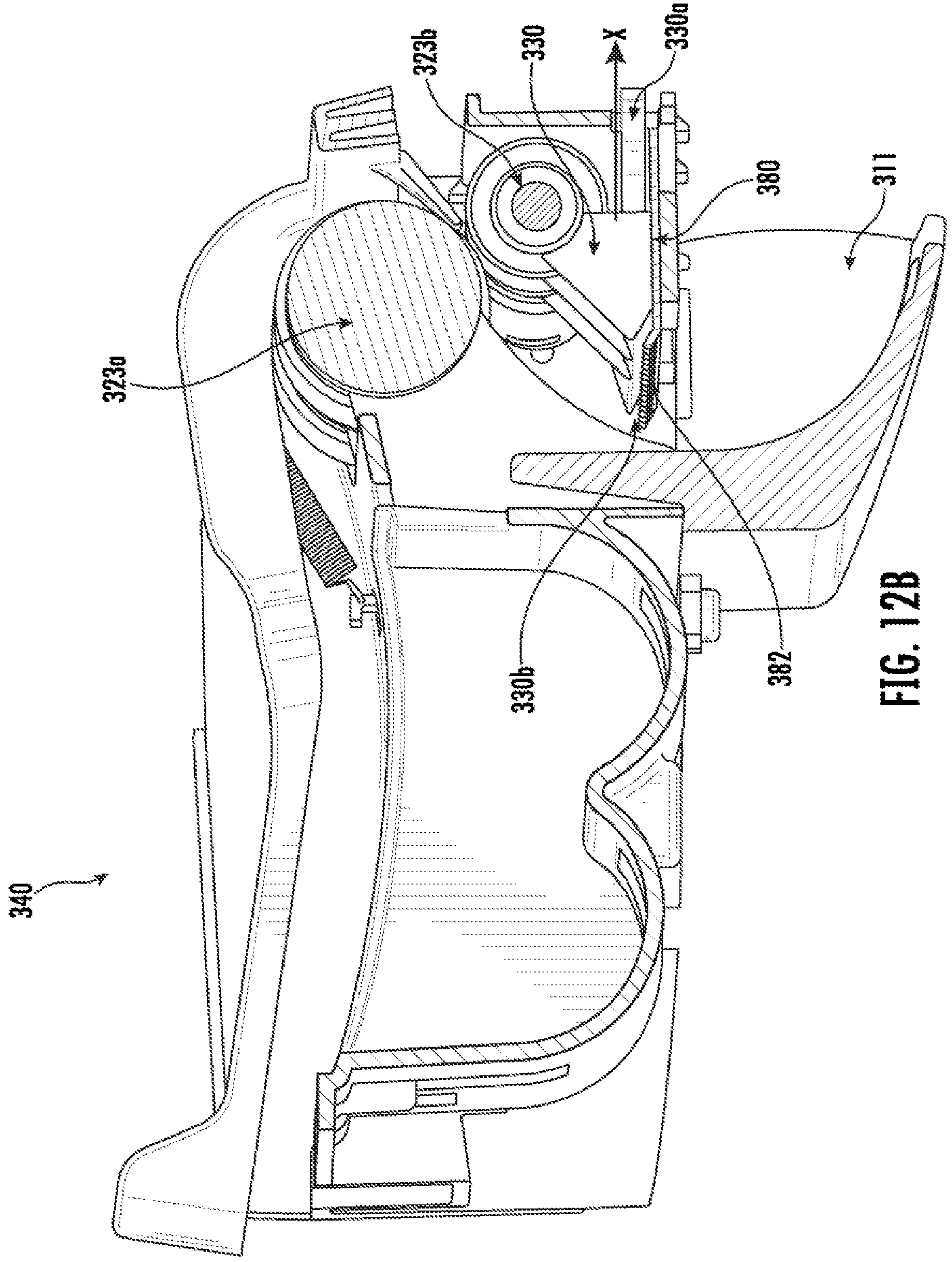

A shuttle 330 may be positioned within the chassis 340 and movable between an unactuated position (shown in FIG. 12A) and an actuated position (shown in 12B) where sufficient force is applied to a switch to indicate product removal (the switch is not shown in FIG. 12B). The shuttle 330 may include a first end 330*a* that is configured to interact with the switch and a second end 330*b* that is configured to interact with the sheet product. In this regard, as the user pulls on the dispensed portion of the sheet product to tear against the tear bar 380, the sheet product will also apply a force on the second end 330*b* of the shuttle 330 to cause movement of the shuttle 330 (e.g., along arrow X) to the actuated position (and cause transition of the switch to the actuated configuration).

Figure 13:
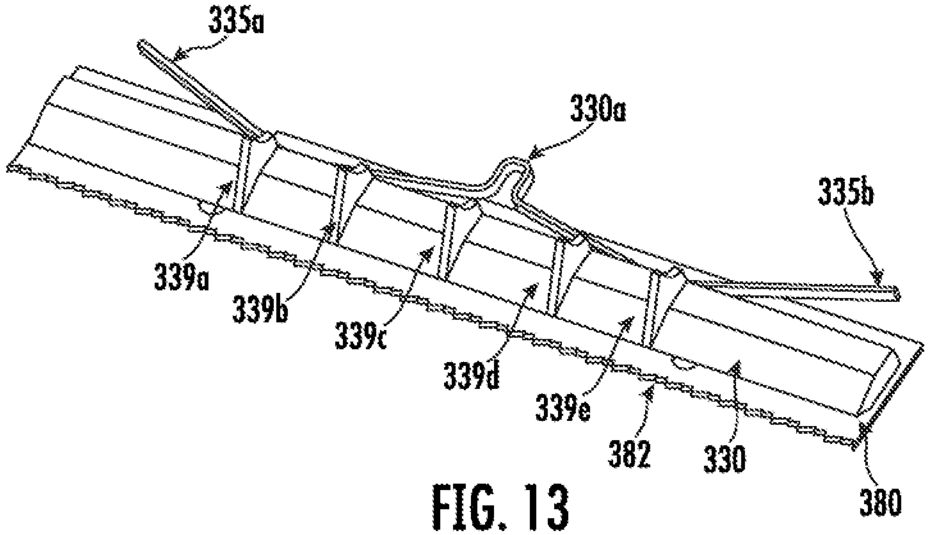
FIG. 13 shows a perspective view of an example fixed tear bar and a movable shuttle, in accordance with some embodiments discussed herein.

FIG. 13 illustrates the shuttle 330 on top of the fixed tear bar 380. In the illustrated embodiment, the shuttle 330 includes support features 339*a*-*e* that provide for an increased surface area along the dispensing pathway for interaction with the sheet product. Additionally, the shuttle 330 includes a first spring feature 335*a* at one end and a second spring feature 335*b* at the opposite end that biases the shuttle 330 to the unactuated position. FIG. 13 also illustrates the second end 330*a* that is used to apply sufficient force to the switch to transition the switch to the actuated configuration—thereby indicating removal of the dispensed product.

Figure 14:
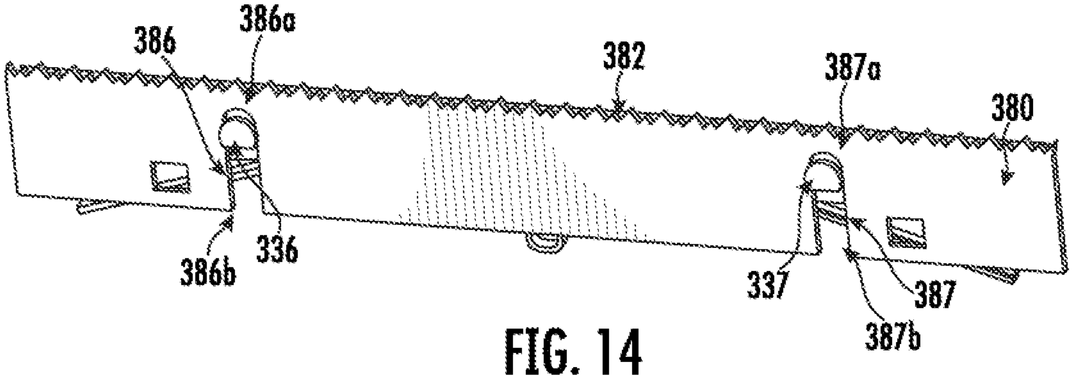
FIG. 14 shows a bottom perspective view of the fixed tear bar and the movable shuttle shown in FIG. 13, in accordance with some embodiments discussed herein.

FIG. 14 illustrates slots 386, 387 defined in the tear bar 380 that enable controlled translation of the shuttle 330 relative thereto. In this regard, the shuttle 330 includes a first engagement feature 336 that slides within the first slot 386 between a first slot end 386*a* (when in the unactuated position) and a second slot end 386*b* (when in the actuated position). Similarly, the shuttle 330 includes a second engagement feature 337 that slides within the second slot 387 between a first slot end 387*a* (when in the unactuated position) and a second slot end 387*b* (when in the actuated position). The illustrated embodiment provides just one example interaction between the movable shuttle and the fixed tear bar—as others are contemplated (e.g., the shuttle may just sit on top of the tear bar).

Some example embodiments of the present invention relate to providing feedback to various user inputs for the product dispenser. In this regard, in some embodiments, a dispenser (such as the sheet product dispenser 10, although any type of product dispenser is contemplated) may include a user interface that enables selection of one or more operations. The user interface may include user input sensors (e.g., capacitive sensors) that are configured to sense the presence of a user to determine that the user is attempting to provide user input thereto (e.g., as opposed to a physical button). However, it may be difficult for such as user (e.g., a maintainer) to determine whether they have effectively provided the user input (e.g., "selected" the button) as there is no physical feedback such as a physical button may otherwise provide. Thus, some example embodiments are designed to provide feedback to the user upon interaction with the user sensor corresponding to the "button".

FIG. 15 illustrates a portion of an example user interface 42 that includes various functionality options for selection by a user. The user interface 42 includes five user selectable options 71, 73, 75, 77, 79. In this regard, in some embodiments, the maintainer may open the cover 14 to reveal a portion of the user interface 42 that enables a maintainer to access and select one or more options. In the depicted embodiment, the maintainer may select (i) whether or not the dispenser should be in on-demand (or command) mode or hang mode using "button" 71 (which may be indicated based on the illuminated state of the proximate light emitting diode (LED) 72); (ii) the range of the activation sensor using "button" 73 (e.g., there are three predetermined range settings to select from—short, medium, long—the selection of each may be indicated by the appropriate proximate LED(s) 74 being illuminated); (iii) the time delay between each dispense using "button" 75 (e.g., there are three predetermined time delay period options—short, medium, long—the selection of each may be indicated by the appropriate proximate LED(s) 76 being illuminated); (iv) the desired sheet length for each dispensed portion of the product using "button" 77 (e.g., there are three predetermined sheet length options—short, medium, long—the selection of each may be indicated by the appropriate proximate LED(s) 78 being illuminated); or (v) an automatic feed operation to run the motor, such as to load a leading edge of a replacement product roll, using "button" 79 (e.g., operate the motor while the "button" is being pressed).

In addition to the "buttons", the user interface may include a portion designed to provide information to the maintainer. For example, the user interface 42 may display information using one or more LEDs. In the depicted embodiment, a first LED may be illuminated to indicate when maintenance is required at 96, a second LED may be illuminated to indicate when dispensing is turned off at 97, and a third LED may be illuminated to indicate when the batteries are running low at 98, although other indications or information may be provided to the user.

Figure 16:
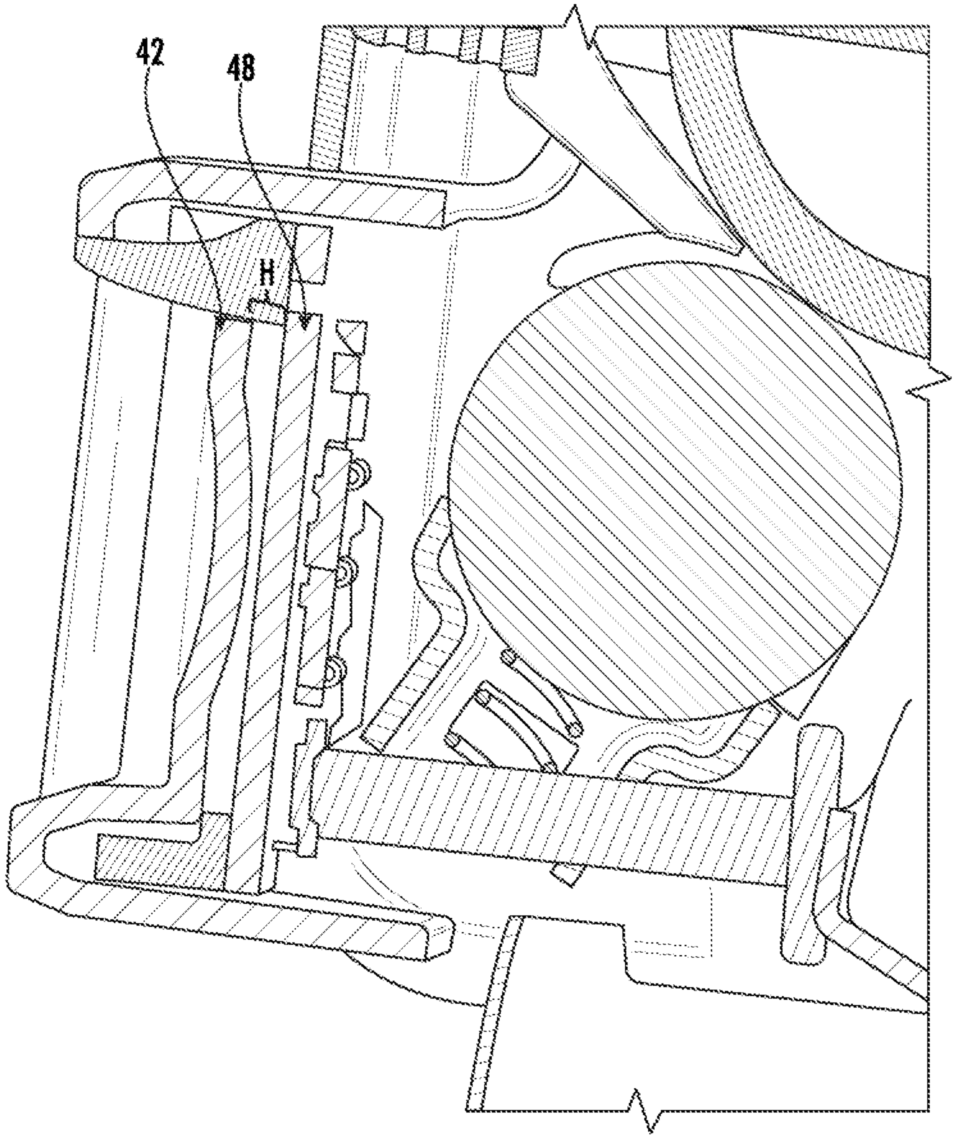
FIG. 16 shows a cross-sectional view of a portion of the user interface shown in FIG. 15, in accordance with some embodiments discussed herein.

Returning to the user interaction with the "buttons" 71, 73, 75, 77, 79, in some embodiments, the system may be configured to provide feedback to the user when the "buttons" are selected to indicate to the user a successful selection. In this regard, in some embodiments, the "buttons" may not otherwise naturally provide the feedback expected (such as may occur with a physical button). For example, with reference to FIG. 16, there may be a space H between the PCB 48 that includes the corresponding capacitive sensor and the face plate of the user interface 42. This is further illustrated when comparing FIG. 17A which includes the face plate of the user interface 42 with FIG. 17B which shows the corresponding user input sensors 47*a*, 47*b*, 47*c*, and 47*d* (47*e* was cut off in the cross-sectional view). Notably, user input sensor 47*a* is positioned behind the "button" 71, user input sensor 47*b* is positioned behind the "button" 73, user input sensor 47*c* is positioned behind the "button" 75, and user input sensor 47*d* is positioned behind the "button" 77.

In some example embodiments, the feedback may be provided via operation of the motor to indicate that the user sensor was triggered (and, thus, the setting has been changed or other operation initiated). In this regard, operation of the motor may cause physical feedback by forming vibrations in the various components of the sheet product dispenser and/or chassis. For example, with reference to FIG. 19, the motor 22 is mounted to the housing 41 of the chassis 40 such that it is vibrationally attached to the housing 41. During operation of the motor 22, the vibrations may be felt by the user "touching" the face plate of the user interface 42. In this regard, operation of the motor 22 may be performed in response to determination of user interaction to one of the user input sensors 71, 73, 75, 77, 79 in order to provide the physical feedback. This operation may be performed simultaneous with or near-simultaneous with (e.g., right after) occurrence of the selection by the user.

In some embodiments, the amount of time the motor is operated may be less than required to perform a dispense operation so as to not cause a wasted dispensed portion to be presented. For example, the amount of time may be selected from within a range of 0.01 seconds—0.5 seconds, such as approximately 0.05 seconds (although other amounts of time are contemplated). In some embodiments, more than 1 second of motor operation may be required to cause a dispensed portion of sheet product to be presented to the user.

In some embodiments, the amount of time the motor is operated may vary depending on which operation is selected and/or which selection within the operation is provided (e.g., a short amount of time of motor operation may correspond to a short setting on the sheet length, delay time, or activation sensor range, whereas a slightly greater amount of time of motor operation may correspond to a medium setting and an even greater amount of time of motor operation may correspond to a long setting). In this regard, in some embodiments, the controller may determine the corresponding selected "button" and the previous operating state and determine the appropriate feedback to provide. Similarly, in some embodiments, the motor may be pulsed during operation and the number of pulses, the amount of time of the pulse, and/or the amount of time between pulses may vary. In some embodiments, operation of the motor may provide audible feedback (e.g., audible noises corresponding to operation of the motor).

Notably, in addition to operating the motor to provide the feedback, the controller may also be configured to perform the corresponding operation that was selected. For example, in response to selecting the "button" 71, the controller may change the mode of operation from on-demand mode to hang mode. As another example, in response to selecting "button" 73, the controller may change the range of the activation sensor to long range. As another example, in response to selecting "button" 75, the controller may change the delay time between dispenses to the long setting. As a further example, in response to selecting "button" 77, the controller may change the sheet length for a dispense to the long setting such that future dispensed portions will have a corresponding length. In some embodiments, when selecting "button" 79, the operation of the motor may be a part of the operation and, thus, the additional feedback through motor operation may not be provided (as the motor is already operating).

Example System Architecture

A schematic representation of components of an example sheet product dispenser system 100 according to various embodiments described herein is shown in FIG. 20, although one or ordinary skill in the art would appreciate the relative differences in components for application of various example embodiments of the present invention for a different type of product dispenser (e.g., soap, napkin, air freshener, etc.). In this regard, a similar schematic representation of a generic product dispenser is shown in FIG. 21.

It should also be appreciated that the illustration in FIG. 20 is for purposes of description and that the relative size and placement of the respective components may differ. The sheet product dispenser system 100, which includes a product dispenser 105 (e.g., a sheet product dispenser according to various embodiments described herein), includes components and systems that are utilized in various embodiments described herein.

The product dispenser 105 may include many different components and/or systems, including, for example, a controller 110, a dispensing mechanism 121, a motor 122, one or more rollers 123 (e.g., a pinch roller, a drive roller, etc.), a memory 112, a communication interface 113, one or more user interfaces 142 (which may include one or more sensor(s) 119), a power system 116, one or more activation sensors 120, one or more product sensors 118, a transfer mechanism 146, a tear mechanism 180, a tear shuttle 130, and other sensor(s)/system(s) 115 such as described herein. Though shown in FIG. 20 as being a component of the product dispenser 105, such components are not required to be part of the product dispenser 105 according to various embodiments herein. For example, product dispensers of various embodiments described herein may include different components, but still function according to the desired embodiment. For example, some embodiments may include more or less product rolls 151, 153 and, in some cases, may include additional sets of components (e.g., additional dispensing mechanism). Along these lines, the depicted embodiment of FIG. 20 is provided for explanatory purposes and is not meant to be limiting.

As will be described in more detail herein, the controller 110 provides logic and control functionality used during operation of the product dispenser 105. Alternatively, the functionality of the controller 110 may be distributed to several controllers that each provides more limited functionality to discrete portions of the operation of product dispenser 105.

The activation sensor(s) 120 may be configured to sense/receive user input (such as a user's hand or portion thereof) indicating a desire to cause the product dispenser 105 to dispense a portion of sheet product (e.g., from the product roll 150). The activation sensor(s) 120 may be any type of sensor or feature capable of receiving user input to begin dispensing, including for example, a capacitive sensor, a light sensor, an IR sensor, a mechanical lever or button, etc. The activation sensor(s) 120 may be in communication with the controller 110 such that the controller 110 can determine when to cause dispensing of the sheet product.

The dispensing mechanism 121 may be configured to cause dispensing of a portion of the sheet product, such as a portion (or length) of the currently loaded product roll (e.g., product roll 151, although, in some cases, both product rolls 151, 153 may be loaded into a single dispensing mechanism 121 for double sheeting). Depending on the configuration, the dispensing mechanism 121 may comprise a motor 122 that drives one or more rollers 123 (e.g., a pinch roller and a drive roller). In the dispensing mechanism, a portion of the product roll may be sandwiched (e.g., in frictional contact) between a drive roller and a pinch roller such that operation/rotation of the drive roller causes dispensing of a portion of the product roll. The dispensing mechanism motor 122 may be in communication with the controller 110 such that the controller 110 may control operation of the motor 122.

A transfer mechanism 146 may be configured to enable transfer of a leading edge of a reserve roll (e.g., second product roll 153) into the dispensing mechanism 121 (e.g., into the nip between the pinch roller and drive roller) upon depletion (or near depletion) of the first product roll 151. The transfer may occur automatically (e.g., electrically or mechanically) in response to the threshold amount of product being reached on the first product roll 151. This may be determined by, for example, one or more product sensors 118 that are configured to determine the amount of product remaining on one or more of the first product roll 151 or the second product roll 153. In some embodiments, the transfer mechanism 146 may be configured to insert the leading edge of the reserve roll into the dispensing mechanism based on a mechanical trigger that may occur upon the amount of product in the first product roll 151 reaching a threshold level. In some embodiments, the physical position of the second product roll 153 may be changed automatically or manually after depletion of the first product roll 151, such as to enable a replacement roll to be positioned within the product dispenser 105 and the corresponding leading edge of the replacement roll to be fed into the transfer mechanism 146 to prime the transfer mechanism 146. The transfer mechanism 146, in some embodiments, may be in communication with the controller 110.

A tear mechanism (e.g., a tear bar) 180 may be operable to aid in removal of the dispensed portion of sheet product. In some embodiments, such as described herein, the tear mechanism 180 may be movable between a first position and second position. A force provided by a user pulling on a dispensed portion of the sheet product may act against the tear mechanism 180 to tear the dispensed portion (e.g., utilizing teeth of the tear mechanism 180) and also cause the tear mechanism 180 to move to the second position. In some embodiments, the tear mechanism 180 may be biased to return to the first position.

During movement of the tear mechanism 180 to the second position, the tear mechanism 180 may provide a force upon a shuttle 130, such as described herein, to cause the shuttle 130 to move from an unactuated position to an actuated position to trigger a switch for the controller 110. In some embodiments, the switch may be mounted to a printed circuit board (PCB) where components or circuitry of the controller 110 may also be mounted. Movement of the shuttle 130 to the actuated position and contacting of the switch may thereby indicate occurrence of a tear event (e.g., a user removing the dispensed portion). The shuttle 130 may be configured to move back to the unactuated position (e.g., due to a bias) upon removal of the dispensed portion and relief from the force that was previously applied to the tear mechanism 180.

Notably, in some embodiments, the tear bar may be fixed, and the shuttle may be configured to move in response to force applied by the sheet product during removal (e.g., directly). An example embodiment along these lines is described with respect to FIGS. 12A, 12B, 13, and 14.

Although the above description details a tear bar and a shuttle, other structures may be utilized to achieve the desired functionality, such as may be evident to one of ordinary skill in the art in view of this disclosure.

The controller 110 is a suitable electronic device capable of executing dispenser functionality via hardware and/or software control, with the preferred embodiment accepting data and instructions, executing the instructions to process the data, and presenting the results. Controller 110 may accept instructions through the user interface 142, or through other means such as, but not limited to, the activation sensor(s) 120, other sensors, voice activation means, manually-operable selection and control means, radiated wavelength and electronic or electrical transfer. Therefore, the controller 110 can be, but is not limited to, a microprocessor, microcomputer, a minicomputer, an optical computer, a board computer, a complex instruction set computer, an ASIC (application specific integrated circuit), a reduced instruction set computer, an analog computer, a digital computer, a molecular computer, a quantum computer, a cellular computer, a solid-state computer, a single-board computer, a buffered computer, a computer network, a desktop computer, a laptop computer, a personal digital assistant (PDA) or a hybrid of any of the foregoing.

The controller 110 may be operably coupled with one or more components of the product dispenser 105. Such operable coupling may include, but is not limited to, solid-core wiring, twisted pair wiring, coaxial cable, fiber optic cable, mechanical, wireless, radio, and infrared. Controller 110 may be configured to provide one or more operating signals to these components and to receive data from these components. Such communication can occur using a well-known computer communications protocol such as Inter-Integrated Circuit (I2C), Serial Peripheral Interface (SPI), System Management Bus (SMBus), Transmission Control Protocol/Internet Protocol (TCP/IP), RS-232, ModBus, or any other communications protocol suitable for the purposes disclosed herein.

The controller 110 may include one or more processors coupled to a memory device 112. Controller 110 may optionally be connected to one or more input/output (I/O) controllers or data interface devices (not shown). The memory 112 may be any form of memory such as an EPROM (Erasable Programmable Read Only Memory) chip, a flash memory chip, a disk drive, or the like. As such, the memory 112 may store various data, protocols, instructions, computer program code, operational parameters, etc. In this regard, controller 110 may include operation control methods embodied in application code. These methods are embodied in computer instructions written to be executed by one or more processors, typically in the form of software. The software can be encoded in any language, including, but not limited to, machine language, assembly language, VHDL (Verilog Hardware Description Language), VHSIC HDL (Very High Speed IC Hardware Description Language), Fortran (formula translation), C, C++, Visual C++, Java, ALGOL (algorithmic language), BASIC (beginners all-purpose symbolic instruction code), visual BASIC, ActiveX, HTML (HyperText Markup Language), and any combination or derivative of at least one of the foregoing. Additionally, an operator can use an existing software application such as a spreadsheet or database and correlate various cells with the variables enumerated in the algorithms. Furthermore, the software can be independent of other software or dependent upon other software, such as in the form of integrated software.

In this regard, in some embodiments, the controller 110 may be configured to execute computer program code instructions to perform aspects of various embodiments of the present invention described herein. For example, as described in various example embodiments, the controller 110 may be configured to determine that user input is provided to a sensor 119 of the user interface 142 and cause operation of the associated function as well as operation of the motor to provide feedback to the user interacting with the sensor 119. Another example includes that the controller 110 may be configured to determine that user input is provided to the activation sensor 120 and, in response, cause operation of the motor to cause a dispense to occur.

The user interface 142 may be configured to provide information and/or indications to a user. In some embodiments, the user interface 142 may comprise one or more light emitting diodes (LEDs) to indicate such information (e.g., low battery, dispensing is occurring, low product amount, transfer complete, etc.). In some embodiments, the user interface 142 may include a screen to display such information. In some embodiments, the user interface 142 may be configured to receive user input such as through various sensors 119 (e.g., described herein) and/or other input devices (e.g., a keypad, touchscreen, physical buttons, etc.). The user interface 142 may be in communication with the controller 110 such that the controller 110 can operate the user interface 142 and/or receive instructions or information from the user interface 142.

One or more user input sensors 119 may, for example, be a part of the user interface 142 and may be configured to sense user input. Different sensors 119 may correspond to different functions (e.g., control settings, operations of the dispenser, etc.) such that interaction of a user (e.g., a maintainer) with the sensor may correspond to a desire for performance of the corresponding function. In some embodiments, the user input sensors 119 may be capacitive sensors that are configured to sense the presence of a user, such as described herein. However, other types of sensors are also contemplated. The sensors 119 may be in communication with the controller 110.

The communication interface 113 may be configured to enable connection to external systems (e.g., an external network 102). In this manner, the controller 110 may retrieve data and/or instructions from or transmit data and/or instructions to a remote, external server via the external network 102 in addition to or as an alternative to the memory 112.

In an example embodiment, the electrical energy (e.g., power 116) for operating the product dispenser 105 may be provided by one or more batteries, which may be comprised of one or more batteries arranged in series or in parallel to provide the desired energy. Additionally or alternatively, the power 116 may be supplied by an external power source, such as an alternating current ("AC") power source or a solar power source, or any other alternative power source as may be appropriate for an application.

The other sensor(s)/system(s) 115 may be any other type of sensors or systems that are usable in various embodiments of the present invention. Some example additional sensors or systems include a position sensor, a time sensor, a cover opening or closing sensor, among many others.

FIG. 21 shows a schematic representation of components of an example product dispenser system 400, such as for dispensing product (e.g., a flowable material, sheet product, air freshener, etc.). In this regard, the product dispenser system 400 includes many similar components to those shown and described with respect to FIG. 20, but relabeled in the 400s. For example, the product dispenser system 400 includes a product dispenser 405 with many different components and/or systems, including, for example, a controller 410, a dispensing mechanism 421, a motor 422, a memory 412, a communication interface 413 (e.g., for communicating via an external network 402), one or more user interfaces 442 (which may include one or more sensor(s) 419), a power system 416, one or more activation sensors 420, one or more product sensors 418, a product source 451 (e.g., one or more reservoirs, one or more stacks, one or more rolls (etc.), and other sensor(s)/system(s) 415 such as described herein.

Example Flowchart(s)

Embodiments of the present invention provide methods, apparatuses and computer program products for controlling and operating an example product dispenser to provide feedback to a user according to various embodiments described herein. Various examples of the operations performed in accordance with embodiments of the present invention will now be provided with reference to FIG. 22.

FIG. 22 illustrates a flowchart according to an example method for controlling and operating an example product dispenser to provide feedback to a user according to an example embodiment 200. The operations illustrated in and described with respect to FIG. 22 may, for example, be performed by, with the assistance of, and/or under the control of one or more of various components, such as illustrated and described with respect to FIGS. 20 and 21. Such example components include the controller 110, 410, memory 112, 412, communication interface 113, 413, user interface 142, 442, user interface sensor(s) 119, 419, activation sensor(s) 120, 420, dispensing mechanism 121, 421, motor 122, 422, and/or other sensor(s)/system(s) 115, 415 of the product dispenser 105, 405. In this regard, as noted herein, various example embodiments may be provided in conjunction with a dispenser for any type of product (e.g., sheet product, soap, sanitizer, air freshener, etc.).

Operation 202 may comprise receiving a signal indicating the presence of a user corresponding to a user input sensor. For example, the maintainer may be providing input to (e.g., selecting) a user input sensor (e.g., a capacitive sensor button), such as on a user interface of a product dispenser. As an example, the maintainer may select to change the sensing distance of the activation sensor to short range. The controller 110, 410 and/or user interface sensor(s) 119, 419 may, for example, provide means for performing operation 202.

Operation 204 may comprise causing operation of the motor to provide feedback to the user. In the above example, the controller may cause the motor to operate for a small amount of time (e.g., 0.05 seconds, 0.01 seconds, 0.5 seconds, etc.) to provide feedback to the maintainer near simultaneous with (or right after) the maintainer interacts with the corresponding user input sensor "button". The controller 110, 410, dispensing mechanism 121, 421, motor 122, 422, and/or other sensor(s)/system(s) 115, 415 may, for example, provide means for performing operation 204.

Operation 206 may comprise performing an operation corresponding to the user input sensor. In the above example, the controller may cause the activation sensor to begin operating according to the indicated shorter range in response to the maintainer interacting with the corresponding user input sensor "button". The controller 110, 410, communication interface 113, 413, user interface 142, 442, activation sensor(s) 120, 420, and/or other sensor(s)/system(s) 115, 415 may, for example, provide means for performing operation 206.

FIG. 22 illustrates an example flowchart of a system, method, and computer program product according to various example embodiments described herein. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by, for example, the memory 112, 412 and executed by, for example, the controller 110, 410. As will be appreciated, any such computer program product may be loaded onto a computer or other programmable apparatus, such that the computer program product including the instructions which execute on the computer or other programmable apparatus creates means for implementing the functions specified in the flowcharts block(s). Further, the computer program product may comprise one or more non-transitory computer-readable mediums on which the computer program instructions may be stored such that the one or more computer-readable memories can direct a computer or other programmable device to cause a series of operations to be performed on the computer or other programmable apparatus to produce a computer-implemented process such that the instructions which execute on the computer or other programmable apparatus implement the functions specified in the flowcharts block(s).

Associated systems and methods for manufacturing example product dispensers described herein are also contemplated by some embodiments of the present invention.

Conclusion

Many modifications and other embodiments of the inventions set forth herein may come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

The invention claimed is:

1. A sheet product dispenser for dispensing sheet product from a source of sheet product, the sheet product dispenser comprising:

a switch for indicating removal of a dispensed portion of the sheet product, wherein the switch comprises an actuated configuration and an unactuated configuration;

a dispensing chute;

a dispensing mechanism operable to dispense the sheet product to provide the dispensed portion of the sheet product for retrieval by a user, wherein at least a portion of the dispensed portion of the sheet product is within the dispensing chute;

a tear bar for separating the dispensed portion from a remainder of the sheet product, wherein the tear bar is movable between a first position and a second position; and a shuttle with a first end and a second end, wherein the shuttle is positioned between the switch and the dispensed portion of the sheet product within the dispensing chute, wherein the shuttle is movable between an unactuated position and an actuated position, wherein, when the shuttle is in the unactuated position, the switch is in the unactuated configuration, wherein the shuttle is positioned between the tear bar and the switch within the sheet product dispenser such that as the user pulls on the dispensed portion a force from the sheet product on the tear bar causes the tear bar to move from the first position to the second position to cause the shuttle to move to the actuated position so that the second end of the shuttle applies a force on the switch sufficient enough to transition the switch to the actuated configuration to indicate removal of the dispensed portion.

2. The sheet product dispenser of claim 1, wherein the shuttle defines a body that includes a first arm and a second arm, wherein the first arm extends toward the tear bar in a first direction and defines a first tear bar end, wherein the second arm extends toward the tear bar in a second direction and defines a second tear bar end, wherein the first direction is different than the second direction such that the first tear bar end and the second tear bar end are spaced apart along the tear bar.

3. The sheet product dispenser of claim 2, wherein the first arm defines a first proximal end and wherein the second arm defines a second proximal end, wherein the body defines a third arm that extends toward the switch and defines the second end of the shuttle and a third proximal end, wherein the first proximal end of the first arm and the second proximal end of the second arm converge at the third proximal end of the third arm.

4. The sheet product dispenser of claim 1, wherein the shuttle is formed separately from the tear bar.

5. The sheet product dispenser of claim 1, wherein the shuttle is formed of flexible material.

6. The sheet product dispenser of claim 1 further comprising an activation sensor configured to sense user input indicating a desire to perform a dispense from the sheet product dispenser, wherein the activation sensor and the switch are mounted to a same printed circuit board.

7. The sheet product dispenser of claim 6, wherein the printed circuit board defines a first side and a second side that is opposite the first side, and wherein the activation sensor is mounted to the first side and the switch is mounted to the second side.

8. The sheet product dispenser of claim 1, wherein the shuttle is configured to translate laterally within the sheet product dispenser between the unactuated position and the actuated position.

9. The sheet product dispenser of claim 1 further comprising a controller configured to control operation of a motor to cause the dispensing mechanism to dispense the sheet product, wherein the switch is mounted to a printed circuit board, wherein the controller includes processing circuitry mounted to the printed circuit board such that the processing circuitry and the switch are mounted to the same printed circuit board.

10. The sheet product dispenser of claim 9, wherein the dispensing mechanism comprises a motor, wherein the sheet product dispenser comprises a sensor configured to sense the presence of a user and provide a signal indicative of the presence of the user and a desire to perform an operation for the dispenser, wherein the controller is operable to:

receive the signal, from the sensor, indicating the presence of the user and the desire to perform the operation for the dispenser;

cause, in response to receiving the signal:

performance of the operation; and operation of the motor for a predetermined amount of time to provide feedback to the user, wherein the predetermined amount of time of operation of the motor is not sufficient to provide a predetermined amount of product to the user, wherein the predetermined amount of product corresponds to a dispense of the product.

11. The sheet product dispenser of claim 1 further comprising a guide slot positioned within the dispenser and sized to movably fit the shuttle therein, wherein the guide slot is configured to direct movement of the shuttle therein between the unactuated position and the actuated position.

12. The sheet product dispenser of claim 1 further comprising a chassis configured for installation within a housing of the sheet product dispenser, wherein the dispensing mechanism and the tear bar are attached with the chassis, and wherein the shuttle is movable within the chassis.

13. The sheet product dispenser of claim 1, wherein the shuttle is biased to the unactuated position.

14. A chassis for a sheet product dispenser for dispensing sheet product from a source of sheet product, the chassis comprising:

a switch for indicating removal of a dispensed portion of the sheet product, wherein the switch comprises an actuated configuration and an unactuated configuration;

a dispensing chute;

a dispensing mechanism operable to dispense the sheet product to provide the dispensed portion of the sheet product for retrieval by a user, wherein at least a portion of the dispensed portion of the sheet product is within the dispensing chute;

a tear bar for separating the dispensed portion from a remainder of the sheet product;

a shuttle positioned between the switch and the dispensed portion of the sheet product within the dispensing chute, wherein the shuttle is movable between an unactuated position and an actuated position, wherein, when the shuttle is in the unactuated position, the switch is in the unactuated configuration, wherein the shuttle and the switch are positioned within the chassis such that as the user pulls on the dispensed portion the shuttle moves to the actuated position and applies a force on the switch sufficient enough to transition the switch to the actuated configuration to indicate removal of the dispensed portion; and an activation sensor configured to sense user input indicating a desire to perform a dispense, wherein the activation sensor and the switch are mounted to a same printed circuit board.

15. The chassis of claim 14, wherein the tear bar is movable between a first position and a second position, wherein the shuttle is positioned between the tear bar and the switch, wherein, as the user pulls on the dispensed portion, a force from the sheet product on the tear bar causes the tear bar to move from the first position to the second position to cause the shuttle to move to the actuated position.

16. The chassis of claim 15, wherein the shuttle defines a body that includes a first arm and a second arm, wherein the first arm extends toward the tear bar in a first direction and defines a first tear bar end, wherein the second arm extends toward the tear bar in a second direction and defines a second tear bar end, wherein the first direction is different than the second direction such that the first tear bar end and the second tear bar end are spaced apart along the tear bar.

17. A shuttle for contacting a switch of a sheet product dispenser, the shuttle comprising:

a body comprising:

a first arm extending in a first direction, wherein the first arm defines a first proximal end and a first distal end, wherein the first distal end is configured to contact a tear bar of the sheet product dispenser;

a second arm extending in a second direction that is different than the first direction, wherein the second arm defines a second proximal end and a second distal end, wherein the second distal end is configured to contact the tear bar of the sheet product dispenser in a spaced apart manner from the first distal end of the first arm; and a third arm extending in a third direction that is different than the first direction and the second direction, wherein the third arm defines a third proximal end and a third distal end, wherein the third distal end is configured to, when a user pulls on a dispensed portion of the sheet product, apply a force on the switch of the sheet product dispenser sufficient enough to transition the switch to an actuated configuration to indicate the occurrence of removal of the dispensed portion of the sheet product from the sheet product dispenser, wherein the first proximal end of the first arm and the second proximal end of the second arm converge at the third proximal end of the third arm.

18. The chassis of claim 14, wherein the printed circuit board defines a first side and a second side that is opposite the first side, and wherein the activation sensor is mounted to the first side and the switch is mounted to the second side.

* * * * *